United States Patent
Bita et al.

(10) Patent No.: US 8,107,155 B2
(45) Date of Patent: Jan. 31, 2012

(54) SYSTEM AND METHOD FOR REDUCING VISUAL ARTIFACTS IN DISPLAYS

(75) Inventors: Ion Bita, San Jose, CA (US); Gang Xu, Cupertino, CA (US); Mark Mienko, San Jose, CA (US); Russell Wayne Gruhlke, Santa Clara, CA (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 627 days.

(21) Appl. No.: 11/545,104

(22) Filed: Oct. 6, 2006

(65) Prior Publication Data
US 2008/0084600 A1    Apr. 10, 2008

(51) Int. Cl.
*G02B 26/00* (2006.01)
*G03B 21/00* (2006.01)
*F21V 7/07* (2006.01)
*G02F 1/1335* (2006.01)

(52) U.S. Cl. ......... 359/290; 359/292; 353/69; 385/146; 362/30; 362/341; 362/561; 362/600; 362/623; 349/62; 349/65; 349/67; 348/744

(58) Field of Classification Search .......... 359/290–295, 359/618, 577, 298, 561, 621; 353/46, 69, 353/81; 348/744, 752, E5.137; 356/511, 356/521, 35.5, 486; 372/39, 92; 345/694, 345/699; 250/201.1, 201.9, 208.1; 358/296, 358/505; 385/129, 146; 349/62–65, 67
See application file for complete search history.

(56) References Cited

U.S. PATENT DOCUMENTS

| | | | |
|---|---|---|---|
| 3,924,929 A | 12/1975 | Holmen | |
| 4,154,219 A | 5/1979 | Gupta et al. | |
| 4,375,312 A | 3/1983 | Tangonan | |
| 4,378,567 A * | 3/1983 | Mir | 358/505 |
| 4,850,682 A | 7/1989 | Gerritsen | |
| 4,863,224 A | 9/1989 | Afian | |
| 4,918,577 A | 4/1990 | Furudate | |
| 4,974,942 A | 12/1990 | Gross | |
| 5,050,946 A | 9/1991 | Hathaway | |
| 5,123,247 A | 6/1992 | Nelson | |
| 5,226,099 A | 7/1993 | Mignardi et al. | |
| 5,283,674 A | 2/1994 | Hanaoka et al. | |
| 5,339,179 A | 8/1994 | Rudisill et al. | 349/65 |
| 5,452,385 A | 9/1995 | Izumi | |

(Continued)

FOREIGN PATENT DOCUMENTS

CN    1381752    11/2002

(Continued)

OTHER PUBLICATIONS

International Search Report dated Mar. 18, 2008 issued in PCT/US2007/020911.

(Continued)

*Primary Examiner* — Loha Ben
(74) *Attorney, Agent, or Firm* — Weaver Austin Villeneuve & Sampson LLP

(57) ABSTRACT

Embodiments include systems and methods for reducing visible artifacts such as Moiré, or interference, patterns, in displays. One embodiment includes a display device comprising a plurality of light modulators and a plurality of illumination elements configured to direct light to the light modulators. The directed light of the plurality of illumination elements collectively defines an nonuniformly varying pattern of light.

34 Claims, 18 Drawing Sheets

U.S. PATENT DOCUMENTS

| | | | |
|---|---|---|---|
| 5,467,417 A | 11/1995 | Nakamura | |
| 5,481,385 A | 1/1996 | Zimmerman et al. | |
| 5,515,184 A | 5/1996 | Caulfield | |
| 5,555,160 A | 9/1996 | Tawara | |
| 5,592,332 A | 1/1997 | Nishio | |
| 5,594,830 A | 1/1997 | Winston | |
| 5,647,036 A | 7/1997 | Deacon et al. | |
| 5,650,865 A | 7/1997 | Smith | |
| 5,659,410 A | 8/1997 | Koike | |
| 5,664,862 A | 9/1997 | Redmond et al. | |
| 5,671,994 A | 9/1997 | Tai | |
| 5,673,128 A | 9/1997 | Ohta et al. | |
| 5,703,667 A | 12/1997 | Ochiai | |
| 5,712,694 A | 1/1998 | Taira et al. | |
| 5,735,590 A | 4/1998 | Kashima | |
| 5,764,315 A | 6/1998 | Yokota et al. | |
| 5,771,321 A | 6/1998 | Stern | |
| 5,782,993 A | 7/1998 | Ponewash | |
| 5,783,614 A | 7/1998 | Chen | |
| 5,808,708 A | 9/1998 | Oyama et al. | |
| 5,810,464 A | 9/1998 | Ishikawa | |
| 5,845,035 A | 12/1998 | Wimberger-Friedl | |
| 5,854,872 A | 12/1998 | Tai | |
| 5,883,684 A | 3/1999 | Millikan et al. | |
| 5,892,598 A | 4/1999 | Asakawa et al. | |
| 5,913,594 A | 6/1999 | Iimura | |
| 5,956,106 A | 9/1999 | Petersen | |
| 5,961,198 A | 10/1999 | Hira | |
| 5,982,540 A | 11/1999 | Koike | |
| 6,014,192 A | 1/2000 | Lehureau | |
| 6,040,937 A | 3/2000 | Miles | |
| 6,048,071 A | 4/2000 | Sawayama | |
| 6,055,090 A | 4/2000 | Miles | |
| 6,068,382 A | 5/2000 | Fukui | |
| 6,073,034 A | 6/2000 | Jacobsen | |
| 6,074,069 A | 6/2000 | Chao-Ching | |
| 6,091,469 A | 7/2000 | Naito | |
| 6,099,134 A | 8/2000 | Taniguchi et al. | 362/618 |
| 6,104,454 A | 8/2000 | Hiyama et al. | |
| 6,123,431 A | 9/2000 | Teragaki | |
| 6,128,077 A * | 10/2000 | Jovin et al. | 356/310 |
| 6,151,089 A | 11/2000 | Yang et al. | |
| 6,195,196 B1 | 2/2001 | Kimura | |
| 6,196,691 B1 | 3/2001 | Ochiai | |
| 6,199,989 B1 | 3/2001 | Maeda et al. | |
| 6,232,937 B1 | 5/2001 | Jacobsen | |
| 6,259,082 B1 | 7/2001 | Fujimoto et al. | |
| 6,259,854 B1 | 7/2001 | Shinji et al. | |
| 6,273,577 B1 | 8/2001 | Goto | |
| 6,283,602 B1 | 9/2001 | Kawaguchi et al. | |
| 6,322,901 B1 | 11/2001 | Bawendi | |
| 6,323,892 B1 | 11/2001 | Mihara | |
| 6,371,623 B1 | 4/2002 | Toyoda | |
| 6,407,785 B1 | 6/2002 | Yamazaki | |
| 6,412,969 B1 | 7/2002 | Torihara | |
| 6,454,452 B1 | 9/2002 | Sasagawa et al. | 362/561 |
| 6,456,279 B1 | 9/2002 | Kubo | |
| 6,478,432 B1 | 11/2002 | Dyner | |
| 6,494,588 B1 | 12/2002 | Okada | |
| 6,504,589 B1 | 1/2003 | Kashima | |
| 6,512,626 B1 | 1/2003 | Schmidt | |
| 6,522,373 B1 | 2/2003 | Hira et al. | |
| 6,522,794 B1 | 2/2003 | Bischel | |
| 6,540,368 B2 | 4/2003 | Akaoka | |
| 6,561,661 B2 | 5/2003 | Egawa | |
| 6,565,225 B2 | 5/2003 | Mabuchi et al. | |
| 6,582,095 B1 | 6/2003 | Toyoda | |
| 6,592,234 B2 | 7/2003 | Epstein | |
| 6,598,987 B1 | 7/2003 | Parikka | |
| 6,603,520 B2 | 8/2003 | Umemoto | |
| 6,631,998 B2 | 10/2003 | Egawa et al. | |
| 6,636,358 B2 | 10/2003 | Umemoto et al. | |
| 6,642,913 B1 | 11/2003 | Kimura | |
| 6,643,067 B2 | 11/2003 | Miyamae | |
| 6,650,455 B2 | 11/2003 | Miles | |
| 6,652,109 B2 | 11/2003 | Nakamura | |
| 6,657,683 B2 | 12/2003 | Richard | |
| 6,659,615 B2 | 12/2003 | Umemoto | |
| 6,660,997 B2 * | 12/2003 | Laberge et al. | 250/231.18 |
| 6,667,782 B1 | 12/2003 | Taira et al. | |
| 6,669,350 B2 | 12/2003 | Yamashita | |
| 6,674,562 B1 | 1/2004 | Miles | |
| 6,680,792 B2 | 1/2004 | Miles | |
| 6,693,690 B2 | 2/2004 | Umemoto | |
| 6,697,403 B2 | 2/2004 | Lee et al. | |
| 6,706,339 B1 | 3/2004 | Miyatake et al. | |
| 6,709,123 B2 | 3/2004 | Flohr | |
| 6,741,788 B2 * | 5/2004 | Steiner et al. | 385/115 |
| 6,742,907 B2 | 6/2004 | Funamoto et al. | |
| 6,742,921 B2 | 6/2004 | Umemoto | |
| 6,747,801 B2 | 6/2004 | Umemoto | |
| 6,751,023 B2 | 6/2004 | Umemoto et al. | |
| 6,761,461 B2 | 7/2004 | Mizutani et al. | |
| 6,773,126 B1 | 8/2004 | Hatjasalo | |
| 6,775,460 B2 * | 8/2004 | Steiner et al. | 385/146 |
| 6,778,746 B2 | 8/2004 | Charlton | |
| 6,784,948 B2 | 8/2004 | Kawashima et al. | |
| 6,792,293 B1 | 9/2004 | Awan et al. | |
| 6,794,119 B2 | 9/2004 | Miles | |
| 6,798,469 B2 | 9/2004 | Kimura | |
| 6,819,380 B2 | 11/2004 | Wen et al. | |
| 6,852,396 B1 | 2/2005 | Mineo | |
| 6,853,418 B2 | 2/2005 | Suzuki et al. | |
| 6,862,141 B2 * | 3/2005 | Olczak | 359/621 |
| 6,864,882 B2 | 3/2005 | Newton | |
| 6,865,312 B2 | 3/2005 | Niv et al. | |
| 6,879,354 B1 | 4/2005 | Sawayama | |
| 6,883,924 B2 | 4/2005 | Maeda et al. | |
| 6,883,934 B2 | 4/2005 | Kawakami | |
| 6,891,530 B2 | 5/2005 | Umemoto | |
| 6,897,855 B1 | 5/2005 | Matthies | |
| 6,930,816 B2 | 8/2005 | Mochizuki | |
| 6,951,401 B2 | 10/2005 | Van Hees et al. | |
| 6,960,010 B2 | 11/2005 | Matsumoto et al. | |
| 6,961,045 B2 * | 11/2005 | Tsao | 345/103 |
| 6,964,484 B2 * | 11/2005 | Gupta et al. | 353/69 |
| 7,001,060 B1 | 2/2006 | Kimura | |
| 7,010,212 B2 | 3/2006 | Emmons et al. | |
| 7,018,088 B2 | 3/2006 | Yu | |
| 7,025,461 B2 | 4/2006 | Veligdan | |
| 7,042,444 B2 | 5/2006 | Cok | |
| 7,042,643 B2 | 5/2006 | Miles | |
| 7,054,045 B2 | 5/2006 | McPheters | |
| 7,056,001 B2 | 6/2006 | Chuang | |
| 7,061,226 B2 * | 6/2006 | Durr | 324/121 R |
| 7,072,096 B2 | 7/2006 | Holman et al. | |
| 7,110,158 B2 | 9/2006 | Miles | |
| 7,123,216 B1 | 10/2006 | Miles | |
| 7,128,459 B2 | 10/2006 | Igarashi et al. | |
| 7,133,022 B2 | 11/2006 | Grabert | |
| 7,142,347 B2 | 11/2006 | Islam | |
| 7,156,546 B2 | 1/2007 | Higashiyama | |
| 7,161,136 B1 * | 1/2007 | Wenstrand et al. | 250/221 |
| 7,163,315 B2 | 1/2007 | Chang et al. | |
| 7,180,672 B2 * | 2/2007 | Olczak | 359/621 |
| 7,206,133 B2 * | 4/2007 | Cassarly et al. | 359/630 |
| 7,212,345 B2 * | 5/2007 | Wilson | 359/619 |
| 7,218,812 B2 | 5/2007 | Maxwell | |
| 7,221,418 B2 | 5/2007 | Lee | |
| 7,223,010 B2 | 5/2007 | Min | |
| 7,262,754 B1 | 8/2007 | Yamazaki | |
| 7,262,916 B2 | 8/2007 | Kao | |
| 7,278,772 B2 | 10/2007 | Kunimochi | |
| 7,278,774 B2 | 10/2007 | Chang | |
| 7,290,917 B2 | 11/2007 | Cho et al. | |
| 7,324,284 B2 * | 1/2008 | Olczak | 359/621 |
| 7,346,251 B2 | 3/2008 | Bose | |
| 7,352,501 B2 | 4/2008 | Chopra et al. | |
| 7,352,940 B2 | 4/2008 | Charters | |
| 7,355,780 B2 | 4/2008 | Chui | |
| 7,357,552 B2 | 4/2008 | Takada | |
| 7,357,557 B2 | 4/2008 | Miyashita | |
| 7,359,011 B2 | 4/2008 | Hamada | |
| 7,360,899 B2 * | 4/2008 | McGuire et al. | 353/20 |
| 7,366,393 B2 * | 4/2008 | Cassarly et al. | 385/146 |
| 7,375,779 B2 | 5/2008 | Lee et al. | |
| 7,377,678 B2 | 5/2008 | Huang | |

| | | | | | | |
|---|---|---|---|---|---|---|
| 7,380,969 B2 | 6/2008 | Yamashita | | 2004/0100796 A1 | 5/2004 | Ward |
| 7,380,970 B2 | 6/2008 | Hwang | | 2004/0109305 A1 | 6/2004 | Chisholm |
| 7,389,476 B2 | 6/2008 | Senda et al. | | 2004/0135494 A1 | 7/2004 | Miyatake |
| 7,400,439 B2 | 7/2008 | Holman | | 2004/0170373 A1 | 9/2004 | Kim |
| 7,417,784 B2 | 8/2008 | Sasagawa | | 2004/0188599 A1 | 9/2004 | Viktorovitch et al. |
| 7,450,295 B2 | 11/2008 | Tung | | 2004/0207995 A1 | 10/2004 | Park |
| 7,477,809 B1 | 1/2009 | Tan et al. | | 2004/0228109 A1 | 11/2004 | Leu |
| 7,508,571 B2 | 3/2009 | Gally | | 2004/0228112 A1 | 11/2004 | Takata |
| 7,515,336 B2 | 4/2009 | Lippey | | 2004/0246743 A1 | 12/2004 | Lee |
| 7,520,642 B2 | 4/2009 | Holman et al. | | 2005/0002175 A1 | 1/2005 | Matsui et al. |
| 7,532,800 B2 | 5/2009 | Iimura | | 2005/0024849 A1 | 2/2005 | Parker et al. ................. 362/600 |
| 7,545,569 B2 * | 6/2009 | Cassarly ........................ 359/628 | | 2005/0024890 A1 | 2/2005 | Yamamoto |
| 7,553,749 B2 | 6/2009 | Hu | | 2005/0030732 A1 | 2/2005 | Kimura |
| 7,561,133 B2 | 7/2009 | Mestha | | 2005/0041175 A1 | 2/2005 | Akiyama |
| 7,564,612 B2 | 7/2009 | Chui | | 2005/0046011 A1 | 3/2005 | Chen |
| 7,603,001 B2 | 10/2009 | Wang | | 2005/0062410 A1 | 3/2005 | Bell et al. |
| 7,663,714 B2 | 2/2010 | Haga et al. | | 2005/0069254 A1 | 3/2005 | Schultheis |
| 7,674,028 B2 * | 3/2010 | Cassarly et al. .............. 362/600 | | 2005/0088719 A1 | 4/2005 | Patel |
| 7,706,050 B2 | 4/2010 | Sampsell | | 2005/0120553 A1 | 6/2005 | Brown |
| 7,733,439 B2 | 6/2010 | Sampsell | | 2005/0133761 A1 | 6/2005 | Thielemans |
| 7,750,886 B2 | 7/2010 | Sampsell | | 2005/0141065 A1 | 6/2005 | Masamoto |
| 7,758,227 B1 | 7/2010 | Coleman | | 2005/0146897 A1 | 7/2005 | Mimura |
| 7,766,498 B2 | 8/2010 | Sampsell | | 2005/0185416 A1 | 8/2005 | Lee et al. |
| 7,777,954 B2 | 8/2010 | Gruhlke | | 2005/0195175 A1 | 9/2005 | Anderson |
| 7,843,061 B2 | 11/2010 | Poli et al. | | 2005/0206802 A1 | 9/2005 | Creemers |
| 7,876,489 B2 | 1/2011 | Gandhi et al. | | 2005/0225865 A1 | 10/2005 | Olczak |
| 2001/0003504 A1 | 6/2001 | Ishihara | | 2005/0231977 A1 | 10/2005 | Hayakawa |
| 2001/0010630 A1 | 8/2001 | Umemoto | | 2005/0231981 A1 | 10/2005 | Hoelen et al. |
| 2001/0019380 A1 | 9/2001 | Ishihara | | 2005/0248524 A1 | 11/2005 | Feng |
| 2001/0019479 A1 | 9/2001 | Nakabayashi | | 2005/0253980 A1 | 11/2005 | Saito |
| 2001/0022636 A1 | 9/2001 | Yang et al. | | 2005/0254771 A1 | 11/2005 | Yamashita |
| 2001/0030861 A1 | 10/2001 | Oda | | 2005/0259302 A9 | 11/2005 | Metz et al. |
| 2001/0055208 A1 | 12/2001 | Kimura | | 2005/0259939 A1 | 11/2005 | Rinko |
| 2002/0006036 A1 | 1/2002 | Egawa | | 2005/0270798 A1 | 12/2005 | Lee |
| 2002/0034071 A1 | 3/2002 | Mabuchi | | 2005/0271325 A1 | 12/2005 | Anderson |
| 2002/0044445 A1 | 4/2002 | Bohler | | 2005/0286113 A1 | 12/2005 | Miles |
| 2002/0051354 A1 | 5/2002 | Egawa | | 2006/0001942 A1 | 1/2006 | Chui |
| 2002/0054258 A1 | 5/2002 | Kondo | | 2006/0002141 A1 | 1/2006 | Ouderkirk |
| 2002/0080597 A1 | 6/2002 | Coghlan | | 2006/0002675 A1 | 1/2006 | Choi |
| 2002/0106182 A1 | 8/2002 | Kawashima | | 2006/0024017 A1 | 2/2006 | Page |
| 2002/0135560 A1 | 9/2002 | Akaoka | | 2006/0044523 A1 | 3/2006 | Teijido |
| 2002/0149584 A1 | 10/2002 | Simpson | | 2006/0050032 A1 | 3/2006 | Gunner |
| 2002/0154256 A1 | 10/2002 | Gotoh | | 2006/0051048 A1 | 3/2006 | Gardiner |
| 2002/0172039 A1 | 11/2002 | Inditsky | | 2006/0061705 A1 | 3/2006 | Onishi |
| 2003/0012009 A1 | 1/2003 | Suzuki | | 2006/0062016 A1 | 3/2006 | Dejima |
| 2003/0016930 A1 | 1/2003 | Inditsky | | 2006/0066541 A1 | 3/2006 | Gally |
| 2003/0030764 A1 | 2/2003 | Lee | | 2006/0066586 A1 | 3/2006 | Gally |
| 2003/0034445 A1 | 2/2003 | Boyd et al. | | 2006/0066783 A1 | 3/2006 | Sampsell |
| 2003/0067760 A1 | 4/2003 | Jagt | | 2006/0066935 A1 | 3/2006 | Cummings |
| 2003/0071947 A1 | 4/2003 | Shiraogawa | | 2006/0072315 A1 | 4/2006 | Han et al. |
| 2003/0081154 A1 | 5/2003 | Coleman | | 2006/0072339 A1 | 4/2006 | Li et al. |
| 2003/0083429 A1 | 5/2003 | Smith | | 2006/0083028 A1 | 4/2006 | Sun et al. |
| 2003/0086030 A1 | 5/2003 | Taniguchi | | 2006/0110090 A1 | 5/2006 | Ellwood |
| 2003/0086031 A1 | 5/2003 | Taniguchi | | 2006/0114244 A1 | 6/2006 | Saxena |
| 2003/0090887 A1 | 5/2003 | Igarashi | | 2006/0126142 A1 | 6/2006 | Choi |
| 2003/0095401 A1 | 5/2003 | Hanson | | 2006/0132383 A1 | 6/2006 | Gally |
| 2003/0098957 A1 | 5/2003 | Haldiman | | 2006/0146575 A1 | 7/2006 | Saito |
| 2003/0099118 A1 | 5/2003 | Saitoh | | 2006/0164861 A1 | 7/2006 | Maeda |
| 2003/0103177 A1 | 6/2003 | Maeda | | 2006/0181866 A1 | 8/2006 | Jung |
| 2003/0103344 A1 | 6/2003 | Niida | | 2006/0181903 A1 | 8/2006 | Okuwaki |
| 2003/0123245 A1 | 7/2003 | Parker | | 2006/0187676 A1 | 8/2006 | Ishikura |
| 2003/0160919 A1 | 8/2003 | Suzuki | | 2006/0209012 A1 | 9/2006 | Hagood, IV |
| 2003/0165067 A1 | 9/2003 | Imamura | | 2006/0209385 A1 | 9/2006 | Liu |
| 2003/0169385 A1 | 9/2003 | Okuwaki | | 2006/0215958 A1 | 9/2006 | Yeo |
| 2003/0184989 A1 | 10/2003 | Matsumoto et al. | | 2006/0262562 A1 | 11/2006 | Fukasawa |
| 2003/0193630 A1 | 10/2003 | Chiou | | 2006/0265919 A1 | 11/2006 | Huang |
| 2003/0210222 A1 | 11/2003 | Ogiwara | | 2006/0268574 A1 | 11/2006 | Jung |
| 2003/0210367 A1 | 11/2003 | Nakano | | 2006/0274400 A1 | 12/2006 | Miles |
| 2003/0214728 A1 | 11/2003 | Olczak .......................... 359/707 | | 2006/0285356 A1 | 12/2006 | Tseng |
| 2003/0231483 A1 | 12/2003 | Higashiyama | | 2007/0064294 A1 | 3/2007 | Hoshino et al. |
| 2004/0001169 A1 | 1/2004 | Saiki | | 2007/0081360 A1 | 4/2007 | Bailey |
| 2004/0017599 A1 | 1/2004 | Yang | | 2007/0086176 A1 | 4/2007 | Kanade et al. |
| 2004/0027315 A1 | 2/2004 | Senda et al. | | 2007/0097694 A1 | 5/2007 | Faase |
| 2004/0032401 A1 | 2/2004 | Nakazawa | | 2007/0116424 A1 | 5/2007 | Ting |
| 2004/0032659 A1 | 2/2004 | Drinkwater | | 2007/0133226 A1 | 6/2007 | Mi |
| 2004/0042233 A1 | 3/2004 | Suzuki | | 2007/0133935 A1 | 6/2007 | Fine |
| 2004/0070711 A1 | 4/2004 | Wen | | 2007/0147087 A1 | 6/2007 | Parker |
| 2004/0080938 A1 | 4/2004 | Holman | | 2007/0153243 A1 | 7/2007 | Mestha et al. |
| 2004/0085748 A1 | 5/2004 | Sugiura | | 2007/0171330 A1 | 7/2007 | Hung |

| | | | |
|---|---|---|---|
| 2007/0171418 A1 | 7/2007 | Nyhart | |
| 2007/0177405 A1 | 8/2007 | Chan | |
| 2007/0187852 A1 | 8/2007 | Parker et al. | |
| 2007/0189036 A1 | 8/2007 | Chen | |
| 2007/0196040 A1 | 8/2007 | Wang | |
| 2007/0201234 A1 | 8/2007 | Ottermann | |
| 2007/0210163 A1 | 9/2007 | Han | |
| 2007/0229737 A1 | 10/2007 | Takeda | |
| 2007/0229936 A1 | 10/2007 | Miles | |
| 2007/0241340 A1 | 10/2007 | Pan | |
| 2007/0253717 A1 | 11/2007 | Charters | |
| 2007/0268695 A1* | 11/2007 | Seetzen | 362/231 |
| 2007/0279727 A1 | 12/2007 | Gandhi | |
| 2007/0279935 A1 | 12/2007 | Gardiner | |
| 2007/0285406 A1 | 12/2007 | Kukulj | |
| 2007/0292091 A1 | 12/2007 | Fujii | |
| 2008/0030650 A1 | 2/2008 | Kitagawa | |
| 2008/0031011 A1 | 2/2008 | Hayashi et al. | |
| 2008/0049445 A1 | 2/2008 | Harbers | |
| 2008/0049450 A1 | 2/2008 | Sampsell | |
| 2008/0074402 A1 | 3/2008 | Cornish | |
| 2008/0079687 A1 | 4/2008 | Cernasov | |
| 2008/0084600 A1 | 4/2008 | Bita et al. | |
| 2008/0084602 A1 | 4/2008 | Xu | |
| 2008/0089092 A1 | 4/2008 | Lee et al. | |
| 2008/0090025 A1 | 4/2008 | Freking | |
| 2008/0094853 A1 | 4/2008 | Kim | |
| 2008/0100900 A1 | 5/2008 | Chui | |
| 2008/0170414 A1 | 7/2008 | Wang | |
| 2008/0192484 A1 | 8/2008 | Lee | |
| 2008/0232135 A1 | 9/2008 | Kinder | |
| 2008/0278460 A1 | 11/2008 | Arnett et al. | |
| 2008/0285307 A1 | 11/2008 | Aylward | |
| 2009/0015753 A1 | 1/2009 | Ye | |
| 2009/0050454 A1 | 2/2009 | Matsukawa | |
| 2009/0086466 A1 | 4/2009 | Sugita | |
| 2009/0090611 A1 | 4/2009 | Zeijlon | |
| 2009/0097100 A1 | 4/2009 | Gally | |
| 2009/0126777 A1 | 5/2009 | Khazeni | |
| 2009/0126792 A1 | 5/2009 | Gruhlke et al. | |
| 2009/0135469 A1 | 5/2009 | Lee et al. | |
| 2009/0147332 A1 | 6/2009 | Bita et al. | |
| 2009/0147535 A1 | 6/2009 | Mienko | |
| 2009/0168459 A1 | 7/2009 | Holman | |
| 2009/0190373 A1 | 7/2009 | Bita et al. | |
| 2009/0196068 A1 | 8/2009 | Wang | |
| 2009/0199893 A1 | 8/2009 | Bita | |
| 2009/0199900 A1 | 8/2009 | Bita | |
| 2009/0201301 A1 | 8/2009 | Mienko | |
| 2009/0201565 A1 | 8/2009 | Bita et al. | |
| 2009/0201571 A1 | 8/2009 | Gally | |
| 2009/0231877 A1 | 9/2009 | Mienko | |
| 2009/0251752 A1 | 10/2009 | Gruhlke | |
| 2009/0251783 A1 | 10/2009 | Huibers | |
| 2009/0296193 A1 | 12/2009 | Bita et al. | |
| 2009/0303746 A1 | 12/2009 | Wang | |
| 2009/0310208 A1 | 12/2009 | Wang | |
| 2009/0320899 A1 | 12/2009 | Schiavoni | |
| 2009/0323144 A1 | 12/2009 | Gruhlke | |
| 2009/0323153 A1 | 12/2009 | Sampsell | |
| 2010/0026727 A1 | 2/2010 | Bita et al. | |
| 2010/0033988 A1 | 2/2010 | Chiu | |
| 2010/0051089 A1 | 3/2010 | Khazeni | |
| 2010/0053148 A1 | 3/2010 | Khazeni | |
| 2010/0141557 A1 | 6/2010 | Gruhlke | |
| 2010/0156953 A1 | 6/2010 | Nevitt | |
| 2010/0157406 A1 | 6/2010 | Gruhlke | |
| 2010/0165660 A1 | 7/2010 | Weber et al. | |
| 2010/0177533 A1 | 7/2010 | Griffiths | |
| 2010/0182308 A1 | 7/2010 | Holman | |
| 2010/0302135 A1 | 12/2010 | Larson et al. | |
| 2011/0122479 A1 | 5/2011 | Sampsell | |
| 2011/0157058 A1 | 6/2011 | Bita | |

FOREIGN PATENT DOCUMENTS

| | | | |
|---|---|---|---|
| CN | 1639596 A | | 7/2005 |
| CN | 1643439 A | | 7/2005 |
| CN | 1755494 A | | 4/2006 |
| CN | 1795403 A | | 6/2006 |
| CN | 101226259 | | 7/2008 |
| DE | 199 42 513 | | 3/2001 |
| DE | 102007025092 | | 12/2008 |
| EP | 0 278 038 | | 8/1988 |
| EP | 0 539 099 | | 4/1993 |
| EP | 0 590 511 | | 4/1994 |
| EP | 0 621 500 | | 10/1994 |
| EP | 0 879 991 | | 11/1998 |
| EP | 0 907 050 | | 4/1999 |
| EP | 0 957 392 | | 11/1999 |
| EP | 0 984 314 | | 3/2000 |
| EP | 1 079 264 | | 2/2001 |
| EP | 1 093 105 | | 4/2001 |
| EP | 1 113 218 | | 7/2001 |
| EP | 1 116 987 | | 7/2001 |
| EP | 1 127 984 | | 8/2001 |
| EP | 1 143 270 | | 10/2001 |
| EP | 1 143 270 A2 | | 10/2001 |
| EP | 1 199 512 | | 4/2002 |
| EP | 1 251 454 | | 10/2002 |
| EP | 1 271 223 | | 1/2003 |
| EP | 1 296 094 | | 3/2003 |
| EP | 1 296 094 A1 | | 3/2003 |
| EP | 1 306 609 | | 5/2003 |
| EP | 1 329 664 | | 7/2003 |
| EP | 1 336 876 | | 8/2003 |
| EP | 1 347 315 | | 9/2003 |
| EP | 1 389 775 | | 2/2004 |
| EP | 1 413 543 | | 4/2004 |
| EP | 1 437 610 | | 7/2004 |
| EP | 1 445 629 | | 8/2004 |
| EP | 1 519 218 | | 3/2005 |
| EP | 1 531 302 | | 5/2005 |
| EP | 1 544 537 | | 6/2005 |
| EP | 1 577 701 | | 9/2005 |
| EP | 1 640 764 | | 3/2006 |
| EP | 1 640 961 | | 3/2006 |
| EP | 1 698 918 | | 9/2006 |
| EP | 1 732 141 A | | 12/2006 |
| EP | 1 734 401 | | 12/2006 |
| EP | 1 748 305 | | 1/2007 |
| EP | 1 762 778 A | | 3/2007 |
| EP | 1 832 806 | | 9/2007 |
| EP | 1 870 635 | | 12/2007 |
| EP | 1 975 651 | | 10/2008 |
| EP | 1 988 332 | | 11/2008 |
| EP | 1 988 333 | | 11/2008 |
| EP | 2 061 092 A1 | | 5/2009 |
| EP | 2 061 093 A1 | | 5/2009 |
| EP | 2 068 180 | | 6/2009 |
| EP | 2 068 181 | | 6/2009 |
| EP | 2 068 182 | | 6/2009 |
| EP | 2 069 684 | | 6/2009 |
| EP | 2 069 839 | | 6/2009 |
| EP | 2 069 840 | | 6/2009 |
| EP | 2 069 841 | | 6/2009 |
| FR | 2 889 597 A | | 2/2007 |
| GB | 2 260 203 | | 4/1993 |
| GB | 2 315 356 | | 1/1998 |
| GB | 2 321 532 | | 7/1998 |
| GB | 2 336 933 | | 3/1999 |
| GB | 2 331 615 | | 5/1999 |
| GB | 2 340 281 | | 2/2000 |
| GB | 2 351 834 | | 1/2001 |
| JP | 57-3266 | | 1/1982 |
| JP | 58 115781 | | 8/1983 |
| JP | 60 242408 | | 12/1985 |
| JP | 09 160032 | | 6/1997 |
| JP | 09 171111 | | 6/1997 |
| JP | 09 311333 | | 12/1997 |
| JP | 11-052887 | | 2/1999 |
| JP | 11 167808 | | 6/1999 |
| JP | 11 211999 | | 8/1999 |
| JP | 11 231321 | | 8/1999 |
| JP | 11 232919 | | 8/1999 |
| JP | 11 316553 | | 11/1999 |
| JP | 11 326898 | | 11/1999 |
| JP | 2000-028933 | | 1/2000 |
| JP | 2000 075293 | | 3/2000 |

| | | |
|---|---|---|
| JP | 2000 081848 | 3/2000 |
| JP | 2000 181367 | 6/2000 |
| JP | 2000 193933 | 7/2000 |
| JP | 2000 214804 A | 8/2000 |
| JP | 2000 314882 | 11/2000 |
| JP | 2001-021883 | 1/2001 |
| JP | 2001-283622 | 10/2001 |
| JP | 2002-014344 | 1/2002 |
| JP | 2002 72284 | 3/2002 |
| JP | 2002 090549 | 3/2002 |
| JP | 2002-098838 | 4/2002 |
| JP | 2002-108227 | 4/2002 |
| JP | 2002 174732 | 6/2002 |
| JP | 2002 174780 | 6/2002 |
| JP | 2002 196151 | 7/2002 |
| JP | 2002 245835 | 8/2002 |
| JP | 2002 365438 | 12/2002 |
| JP | 2003 007114 | 1/2003 |
| JP | 2003 057652 | 2/2003 |
| JP | 2003 057653 | 2/2003 |
| JP | 2003-149642 | 5/2003 |
| JP | 2003-149643 | 5/2003 |
| JP | 2003 173713 | 6/2003 |
| JP | 2003 188959 | 7/2003 |
| JP | 2003-315694 | 11/2003 |
| JP | 2003 344881 | 12/2003 |
| JP | 2004-070189 | 3/2004 |
| JP | 2004-126196 | 4/2004 |
| JP | 2005-259365 | 9/2005 |
| JP | 2005-316178 | 11/2005 |
| JP | 2006-065360 A | 3/2006 |
| JP | 2006 099105 | 4/2006 |
| JP | 2006 107993 | 4/2006 |
| JP | 2006 120571 | 5/2006 |
| JP | 2007-218540 A | 8/2007 |
| JP | 2008 103110 | 5/2008 |
| JP | 2009 0300966 | 12/2009 |
| TW | 567388 | 12/2003 |
| WO | WO 94/06871 A1 | 3/1994 |
| WO | WO 95/01584 | 1/1995 |
| WO | WO 96/16348 | 5/1996 |
| WO | WO 97/01240 | 1/1997 |
| WO | WO 98/19201 | 5/1998 |
| WO | WO 98/32047 | 7/1998 |
| WO | WO 98/35182 | 8/1998 |
| WO | WO 98/52094 | 11/1998 |
| WO | WO 99/04296 A | 1/1999 |
| WO | WO 99/63394 | 12/1999 |
| WO | WO 99/64785 A | 12/1999 |
| WO | WO 99/67678 A2 | 12/1999 |
| WO | WO 00/50807 | 8/2000 |
| WO | WO 01/29148 | 4/2001 |
| WO | WO 01/57434 | 8/2001 |
| WO | WO 01/84228 | 11/2001 |
| WO | WO 01/84229 | 11/2001 |
| WO | WO 02/06858 | 1/2002 |
| WO | WO 02/071132 | 9/2002 |
| WO | WO 02/097324 | 12/2002 |
| WO | WO 03/007049 | 1/2003 |
| WO | WO 03/038509 | 5/2003 |
| WO | WO 03/056876 | 7/2003 |
| WO | WO 03/062912 | 7/2003 |
| WO | WO 2004/003643 | 1/2004 |
| WO | WO 2004/012004 | 2/2004 |
| WO | WO 2004/015489 | 2/2004 |
| WO | WO 2004/088372 | 10/2004 |
| WO | WO 2004/114418 | 12/2004 |
| WO | WO 2004/114418 A1 | 12/2004 |
| WO | WO 2005/011012 | 2/2005 |
| WO | WO 2005/076051 | 8/2005 |
| WO | WO 2005/088367 | 9/2005 |
| WO | WO 2005/093490 | 10/2005 |
| WO | WO 2005/111669 | 11/2005 |
| WO | WO 2006/008702 | 1/2006 |
| WO | WO 2006/036415 | 4/2006 |
| WO | WO 2006/036451 | 4/2006 |
| WO | WO 2006/036496 | 4/2006 |
| WO | WO 2007/064133 | 6/2007 |
| WO | WO 2007/094558 | 8/2007 |
| WO | WO 2007/0149474 | 12/2007 |
| WO | WO 2008/027275 | 3/2008 |
| WO | WO 2008/038754 | 4/2008 |
| WO | WO 2008/039229 | 4/2008 |
| WO | WO 2008/045200 | 4/2008 |
| WO | WO 2008/045207 | 4/2008 |
| WO | WO 2008/045218 | 4/2008 |
| WO | WO 2008/045218 A1 | 4/2008 |
| WO | WO 2008/045222 | 4/2008 |
| WO | WO 2008/045224 | 4/2008 |
| WO | WO 2008/045310 | 4/2008 |
| WO | WO 2008/045311 | 4/2008 |
| WO | WO 2008/045312 | 4/2008 |
| WO | WO 2008/045362 | 4/2008 |
| WO | WO 2008/045363 | 4/2008 |
| WO | WO 2008/045364 | 4/2008 |
| WO | WO 2008/045462 | 4/2008 |
| WO | WO 2008/045463 | 4/2008 |
| WO | WO 2008/069877 | 6/2008 |
| WO | WO 2008/137299 | 11/2008 |
| WO | WO 2008/145096 | 12/2008 |
| WO | WO 2009/011922 A1 | 1/2009 |
| WO | WO 2009/064701 | 5/2009 |
| WO | WO 2009/065069 | 5/2009 |
| WO | WO 2009/073555 | 6/2009 |
| WO | WO 2009/076075 | 6/2009 |
| WO | WO 2009/085706 | 7/2009 |
| WO | WO 2009/102670 | 8/2009 |
| WO | WO 2009/102671 | 8/2009 |
| WO | WO 2009/102672 | 8/2009 |
| WO | WO 2009/102731 | 8/2009 |
| WO | WO 2009/149118 | 12/2009 |
| WO | WO 2010/027942 | 3/2010 |
| WO | WO 2010/027944 | 3/2010 |
| WO | WO 2010/033632 | 3/2010 |
| WO | WO 2010/080225 | 7/2010 |
| WO | WO 2010/082952 | 7/2010 |

OTHER PUBLICATIONS

Written Opinion dated Mar. 18, 2008 issued in PCT/US2007/020911.

Olczak et al. (2006), *A Moiré-Free Platform for LCD Backlighting*, presented at the SID Conference on Jun. 7, 2006; SID 2006 Digest, 32.2: pp. 1336-1339.

International Preliminary Report on Patentability, dated Dec. 30, 2008, issued in PCT/US2007/020911.

First Chinese Office Action dated Apr. 14, 2010 issued in Application No. 200780041590.0.

Imenes et al., "Spectral beam splitting technology for increased conversion efficiency in solar concentrating systems: a review" Solar Energy Materials, Elsevier Science Publishers B.V. Amsterdam, NL, vol. 84, Oct. 1, 2004, pp. 19-69, XP002474546.

Extended Search Report in European Application No. 08153694, dated Mar. 30, 2009.

Extended Search Report in European Application No. 08153692, dated Mar. 30, 2009.

International Search Report and Written Opinion in PCT/US2008/083053 (International Publication No. WO 2009/064701), dated Mar. 3, 2009.

International Preliminary Report on Patentability in PCT/US2008/083053 (International Publication No. WO 2009/064701), dated Mar. 15, 2010.

International Search Report and Written Opinion in PCT/US2009/033592(International Publication No. WO 2009/102670), dated Jul. 13, 2009.

International Preliminary Report on Patentability in PCT/US2009/033592 (International Publication No. WO 2009/102670), dated May 12, 2010.

International Search Report and Written Opinion in PCT/US2009/033593(International Publication No. WO 2009/102671), dated Sep. 3, 2009.

International Preliminary Report on Patentability in PCT/US2009/033593 (International Publication No. WO 2009/102671), dated May 28, 2010.

International Search Report and Written Opinion in PCT/US2009/055527 (International Publication No. WO 2010/027942), dated Dec. 30, 2009.

International Search Report and Written Opinion in PCT/US2008/083678 (International Publication No. WO 2009/065069), dated Mar. 27, 2009.

International Preliminary Report on Patentability in PCT/US2008/083678 (International Publication No. WO 2009/065069), dated Feb. 24, 2010.

International Search Report and Written Opinion in PCT/US2009/046941 (International Publication No. WO 2009/082952), dated Jan. 14, 2010.

Fan et al., "Channel Drop Filters in Photonic Crystals", Optics Express, vol. 3, No. 1, pp. 4-11, 1998.

Giles et al., " Silicon MEMS Optical Switch Attenuator and Its Use in Lightwave Subsystems", IEEE Journal of Selected Topics in Quantum Electronics, vol. 5. No. 1, pp. 18-25, Jan./Feb. 1999.

Little et al., "Vertically Coupled Microring Rosonator Channel Dropping Filter", IEEE Photonics Technology Letters, vol. 11, No. 2, pp. 215-217, 1999.

Magel, "Integrated Optic Devices Using Micromachined Metal Membranes", SPIE vol. 2686, 0-8194-2060-3, pp. 54-63, 1996.

Mehregany et al., "MEMS Applications in Optical Systems", IEEE/LEOS 1996 Summer Topical Meetings, pp. 75-76, Aug. 5-9, 1996.

Neal T.D., et. al., "Surface Plasmon enhanced emission from dye doped polymer layers," Optics Express Opt. Soc. America, USA, vol. 13, No. 14, pp. 5522-5527, Jul. 11, 2005.

Oliner, "Radiating Elements and Mutual Coupling," Microwave Scanning Antennas, vol. 2, pp. 131-157 and pp. 190-194, 1966.

OSRAM Opto Semiconductors, "Multi Micro SIDELED," Preliminary Data, Dec. 11, 2008.

Yan, et al., "Edge-Lighting Light Guide Plate Based on Micro-Prism for Liquid Crystal Display," Journal of Display Technology, vol. 5, No. 9, pp. 355-357, Sep. 2009.

Yu, et al., "Design Optimization and Stamper Fabrication of Light Guiding Plates Using Silicon Based Micro-Features," IEEE Symposium on DTIP of MEMS/MOEMS, Rome, Apr. 1-3, 2009.

Zhou et al., "Waveguide Panel Display Using Electromechanical Spatial Modulators" SID Digest, vol. XXIX, 1998.

Austrian Search Report for U.S. Appl. No. 11/064,143 dated Aug. 12, 2005.

Extended European Search Report in App. No. 05255638.8 (Publication No. EP 1640764) dated May 4, 2006.

Extended European Search Report in App. No. 08153436.4 (Publication No. EP 1988332) dated Oct. 1, 2008.

Extended European Search Report in App. No. 08153691.4 (Publication No. EP 2068182) dated Mar. 25, 2009.

Extended European Search Report in App. No. 08153770.6 (Publication No. EP 1988333) dated Sep. 29, 2008.

Extended Search Report in European App. No. 08153686.4 (Publication. No. EP 2068180) dated Apr. 17, 2009.

Extended Search Report in European App. No. 08153690 (Publication No. EP 2068181) dated Mar. 5, 2009.

Extended Search Report in European Application No. 08152870.5 dated Mar. 3, 2010.

International Preliminary Report on Patentability in PCT/US2005/030441 (International Publication No. WO 2006/036415) dated Apr. 5, 2007.

International Preliminary Report on Patentability in PCT/US2007/004277 (International Publication No. WO 2008/039229) dated Aug. 19, 2008.

International Preliminary Report on Patentability in PCT/US2007/014358 (International Publication No. WO 2007/0149474) dated Jul. 31, 2008.

International Preliminary Report on Patentability in PCT/US2007/021375 (International Publication No. WO 2008/045310) dated Apr. 16, 2009.

International Preliminary Report on Patentability in PCT/US2007/021376 (International Publication No. WO 2008/045311) dated Jun. 26, 2009.

International Preliminary Report on Patentability in PCT/US2007/021459 (International Publication No. WO 2008/045363) dated Jan. 14, 2009.

International Preliminary Report on Patentability in PCT/US2007/021460 (International Publication No. WO 2008/045364) dated Apr. 16, 2009.

International Preliminary Report on Patentability in PCT/US2008/061046 (International Publication No. WO 2008/137299) dated Jul. 15, 2009.

International Preliminary Report on Patentability in PCT/US2008/085010 (International Pub. No. WO 2009/073555) dated Apr. 12, 2010.

International Premilinary Report on Patentability in PCT/US2008/085026 (International Pub. No. WO 2009/076075) dated Apr. 12, 2010.

International Search Report in PCT/US2009/045186 (International Pub. No. WO 2009/154957) dated Jan. 29, 2010.

International Search Report and Written Opinion in International Patent Application No. PCT/US2007/020736 (International Publication No. WO 2008/045207) dated Jul. 14, 2008.

International Search Report and Written Opinion in PCT/US2005/006629 (International Publication No. WO 2005/093490) dated Jun. 6, 2005.

International Search Report and Written Opinion in PCT/US2005/030441 (International Publication No. WO 2006/036415) dated Dec. 12, 2005.

International Search Report and Written Opinion in PCT/US2007/014358 (International Publication No. WO 2007/0149474) dated Dec. 13, 2007.

International Search Report and Written Opinion in PCT/US2007/018639 (International Publication No. WO 2008/027275) dated Mar. 20, 2008.

International Search Report and Written Opinion in PCT/US2007/020680 (International Publication No. WO 2008/045200) dated Jul. 1, 2008.

International Search Report and Written Opinion in PCT/US2007/020911 (International Publication No. WO 2008/045218) dated Mar. 18, 2008.

International Search Report and Written Opinion in PCT/US2007/020969 (International Publication No. WO 2008/045222) dated Mar. 5, 2008.

International Search Report and Written Opinion in PCT/US2007/020999 (International Publication No. WO 2008/045224) dated Apr. 8, 2008.

International Search Report and Written Opinion in PCT/US2007/021375 (International Publication No. WO 2008/045310) dated May 14, 2008.

International Search Report and Written Opinion in PCT/US2007/021376 (International Publication No. WO 2008/045311) dated Jun. 18, 2008.

International Search Report and Written Opinion in PCT/US2007/021378 (International Publication No. WO 2008/045312) dated Mar. 5, 2008.

International Search Report and Written Opinion in PCT/US2007/021458 (International Publication No. WO 2008/045362) dated May 14, 2008.

International Search Report and Written Opinion in PCT/US2007/021459 (International Publication No. WO 2008/045363) dated May 14, 2008.

International Search Report and Written Opinion in PCT/US2007/021460 (International Publication No. WO 2008/045364) dated May 14, 2008.

International Search Report and Written Opinion in PCT/US2007/021622 (International Publication No. WO 2008/045462) dated Oct. 22, 2008.

International Search Report and Written Opinion in PCT/US2007/021623 (International Publication No. WO 2008/045463) dated Oct. 22, 2008.

International Search Report and Written Opinion in PCT/US2007/022736 (International Publication No. WO 2008/069877) dated Aug. 14, 2008.

International Search Report and Written Opinion in PCT/US2008/061046 (International Publication No. WO 2008/137299) dated Oct. 1, 2008.

International Search Report and Written Opinion in PCT/US2008/085010 (International Pub. No. WO 2009/073555) dated Mar. 4, 2009.
International Search Report and Written Opinion in PCT/US2008/085026 (International Pub. No. WO 2009/076075) dated Apr. 20, 2009.
International Search Report and Written Opinion in PCT/US2008/086875 (Publication No. WO 2009/085706) dated Oct. 30, 2009.
International Preliminary Report on Patentability in PCT/US2008/086875 (Publication No. WO 2009/085706) dated Jul. 8, 2010.
International Search Report and Written Opinion in PCT/US2009/033597 (Publication No. WO 2009/102672) dated Sep. 10, 2009.
International Preliminary Report on Patentability in PCT/US2009/033597 (Publication No. WO 2009/102672) dated Aug. 26, 2010.
International Search Report and Written Opinion in PCT/US2009/033698 (Publication No. WO 2009/102731) dated Oct. 9, 2009.
International Preliminary Report on Patentability in PCT/US2009/033698 (Publication No. WO 2009/102731) dated Aug. 17, 2010.
International Search Report and Written Opinion in PCT/US2009/040561 (Publication No. WO 2009/129264) dated Jul. 17, 2009.
International Search Report and Written Opinion in PCT/US2009/046020 (International Publication No. WO 2009/149118) dated Feb. 23, 2010.
International Search Report and Written Opinion in PCT/US2009/048677 (International Publication No. WO 2010/002701) dated Sep. 11, 2009.
International Search Report and Written Opinion in PCT/US2009/065584 (International Publication No. WO 2010/0802225) dated Mar. 3, 2010.
International Search Report in PCT/US2010/036735 dated Aug. 17, 2010.
Partial International Search Report in PCT/US2010/036471 (International Publication No. WO 2010/0802225) dated Aug. 23, 2010.
Partial International Search Report in PCT/US2010/036477 dated Aug. 23, 2010.
Partial International Search Report in PCT/US2010/036472 dated Aug. 30, 2010.
Written Opinion of International Searching Authority in PCT/US2007/04277 (International Publication No. WO 2008/039229) dated Apr. 3, 2008.
Chinese Office Action mailed Apr. 14, 2010, from Application No. 200780041590.0.
Idé et al. "Dot pattern generation technique using molecular dynamics" J. Opt. Soc. Am. A/vol. 20, No. 2/Feb. 2003.
Chinese Office Action mailed Jun. 22, 2011, from Application No. 200780041590.0.

* cited by examiner

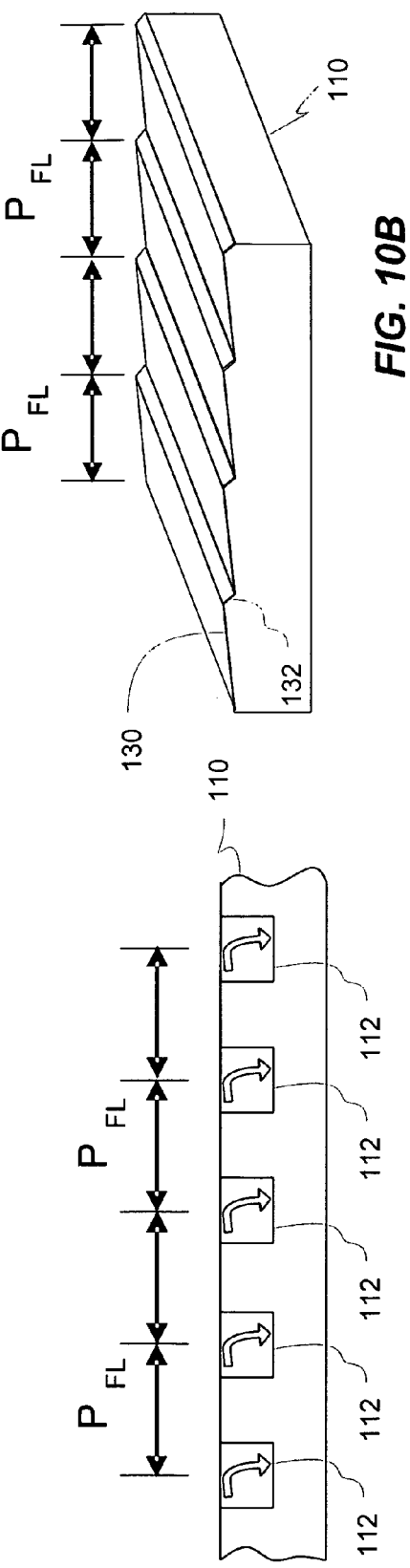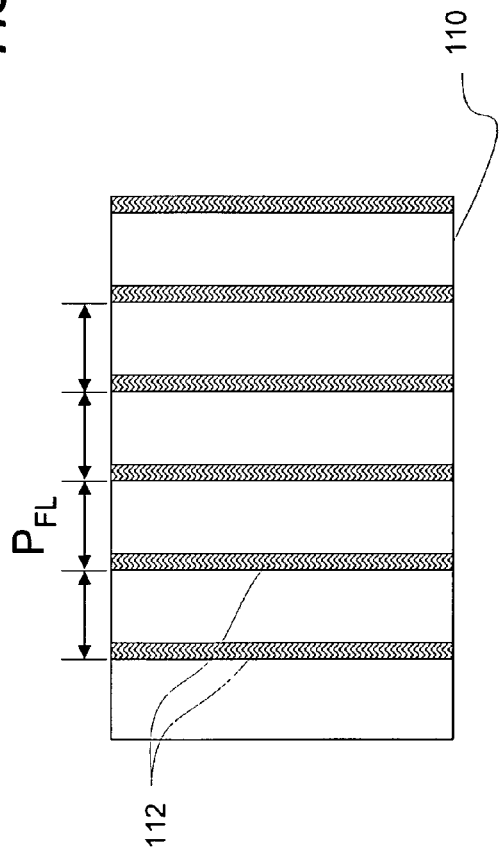
FIG. 10A
FIG. 10B
FIG. 10C

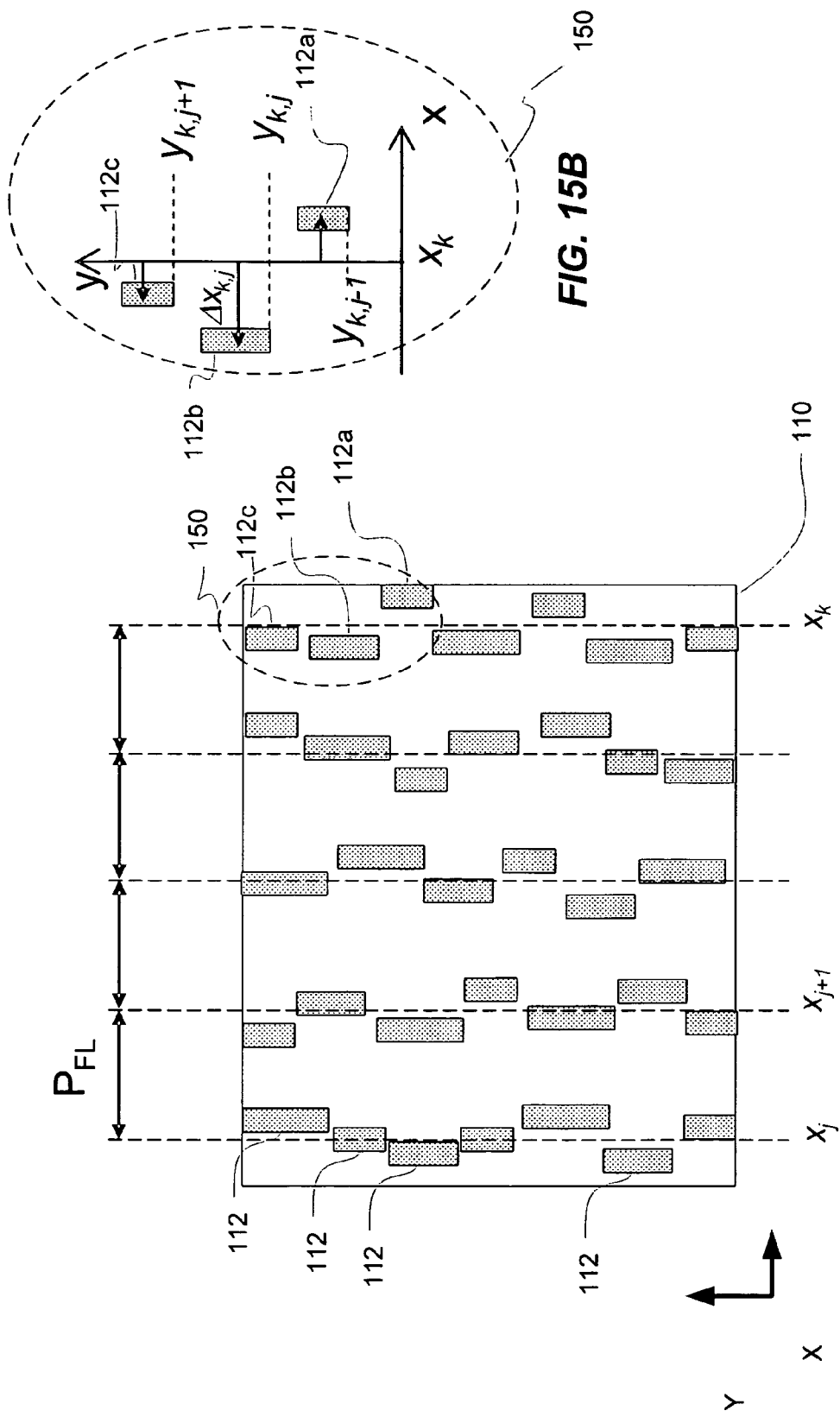

Normal (Gaussian) distribution

Uniform distribution

SYSTEM AND METHOD FOR REDUCING VISUAL ARTIFACTS IN DISPLAYS

BACKGROUND OF THE INVENTION

1. Field

The field of the invention relates to display systems.

2. Description of the Related Technology

Display systems may include light modulators to produce a displayed image by modulating light directed to the light modulators. Such display systems may include a source of illumination to at least partly provide light to the light modulators. One embodiment of a light modulator comprises microelectromechanical systems (MEMS). Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed. For example, a need exists for improved illumination sources for light modulator based displays.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description" one will understand how the features of this invention provide advantages that include reduced visual artifacts or noise in illuminated display systems.

One embodiment comprises a display device. The display device comprises a plurality of light modulators. The display device further comprises a plurality of illumination elements configured to direct a nonuniformly varying pattern of light to the light modulators.

One embodiment comprises a display device. The display device comprises a plurality of light modulators. The display device further comprises a plurality of illumination elements arranged in a nonuniform pattern and configured to direct light to the light modulators.

One embodiment comprises a display device. The display device comprises a plurality of light modulators. The display device further comprises a plurality of illumination elements configured to direct light to the light modulators. The plurality of illumination elements is adapted to illuminate the light modulators without producing a visible moiré pattern.

One embodiment comprises a display device. The display device comprises means for modulating light. The display device further comprises means for illuminating the light modulating means with a nonuniformly varying pattern of light.

Another embodiment comprises a method of making an illuminator. The method comprises forming a plurality of illumination elements configured to direct a nonuniformly varying pattern of light to an array of light modulators.

Another embodiment comprises a method comprising illuminating a plurality of illumination elements with light. The method further comprises directing a nonuniformly varying pattern of the light from the illumination elements to a plurality of light modulators.

BRIEF DESCRIPTION OF THE DRAWINGS

FIG. 10A is a cross section of an example of an illuminator comprising periodically spaced light turning elements such as illustrated in FIG. 8

FIG. 10B is a perspective view of an example of an illuminator comprising periodically spaced reflective light turning elements such as illustrated in FIG. 10A.

FIG. 10C is a top view of an example of an illuminator comprising periodically spaced reflective light turning elements such as illustrated in FIG. 10B.

FIG. 15A illustrates a top view of another embodiment of an illuminator comprising nonuniformly arranged reflective light turning elements that is conceptually similar to that of FIG. 13A.

FIG. 15B illustrates a top view of a portion of the array of light turning elements of FIG. 15A in more detail.

DETAILED DESCRIPTION

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Light modulator based displays, including reflective and interferometric displays, generally comprise periodically arranged light modulators in order to correspond to pixel layouts of video signals. Such light modulators may be illuminated using an illuminator or light guide that directs a pattern of light to the light modulators. The illuminator may comprise a periodically arranged light turning (and/or light emissive) elements that directs a periodic pattern of light onto the array of light modulators. When the periodically arranged array of light modulators is illuminated with the periodic pattern of light from the illuminator, the superposition of the two periodic arrays may result in visible Moiré patterns. It has been found that nonuniform arrangement of the illumination elements that directs a nonuniformly varying pattern of light onto the light modulators reduces or even substantially eliminates visible Moiré patterns resulting from this superposition in such display systems. Accordingly, several inventive examples of such nonuniformly arranged (e.g., irregularly or aperiodically arranged so as to be uncorrelated with the arrangement of the light modulators) illumination arrays are disclosed herein.

Figure 1:
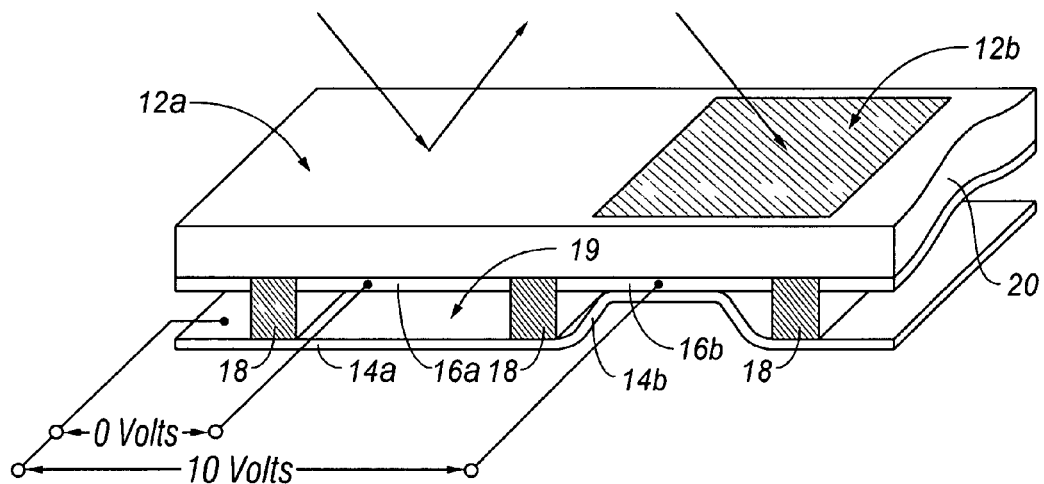
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this FIG.) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
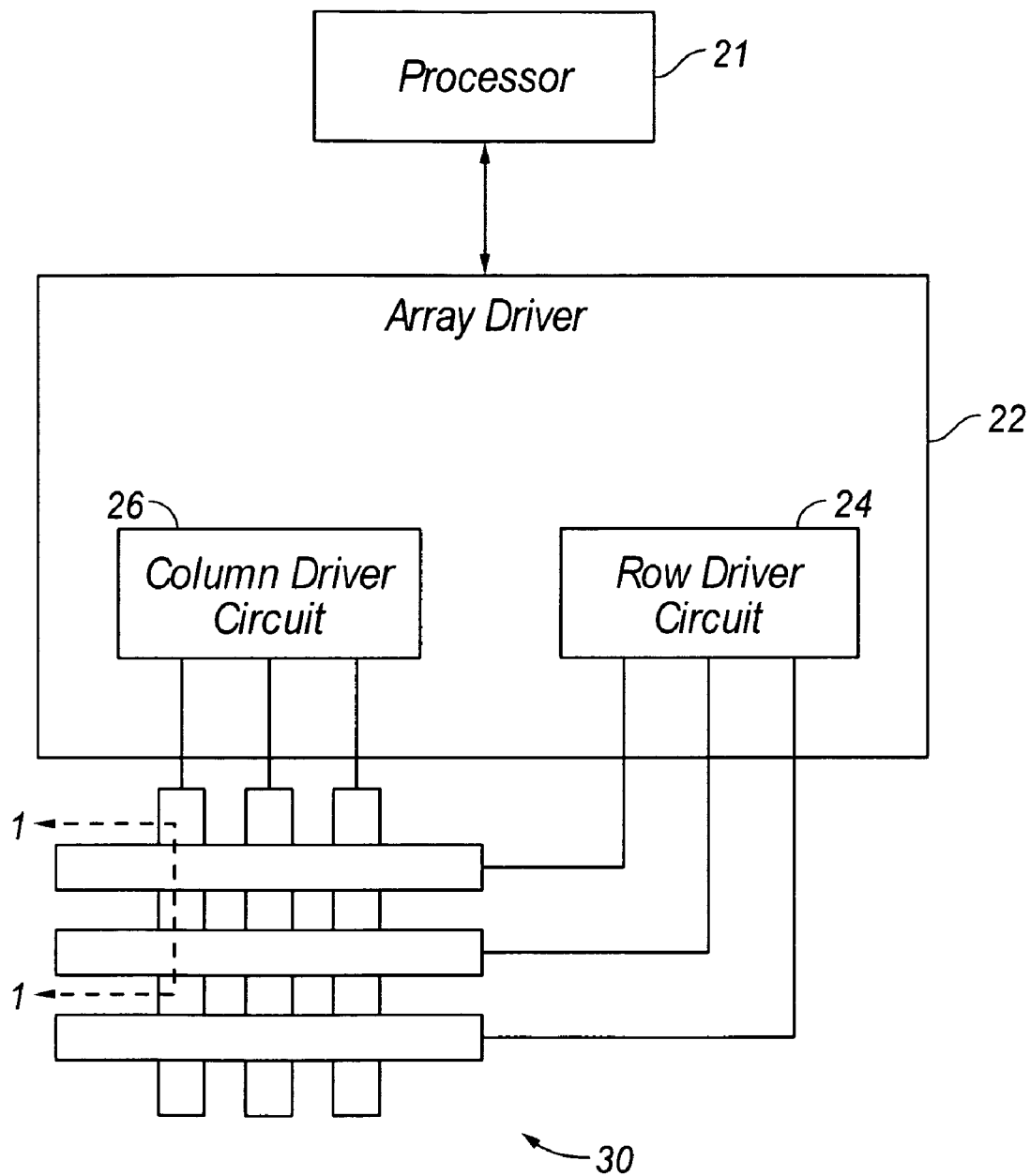
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
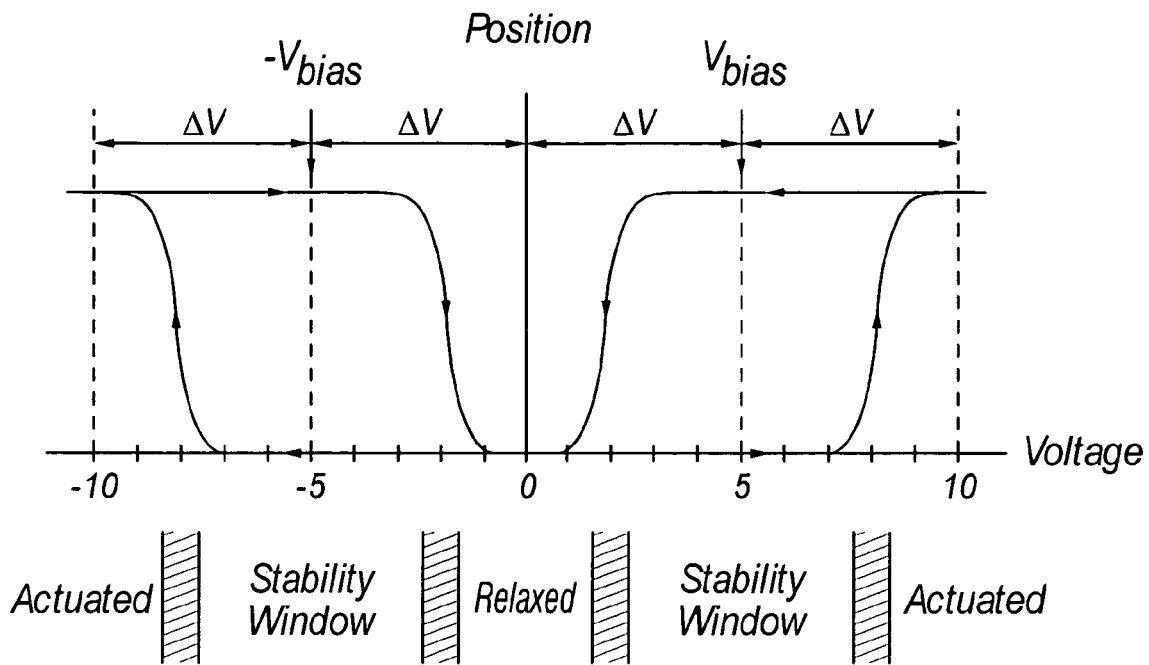
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to −ΔV. In this embodiment, releasing the pixel is accomplished by setting the appropriate column to −$V_{bias}$, and the appropriate row to the same −ΔV, producing a zero volt potential difference across the pixel.

Figure 5A:
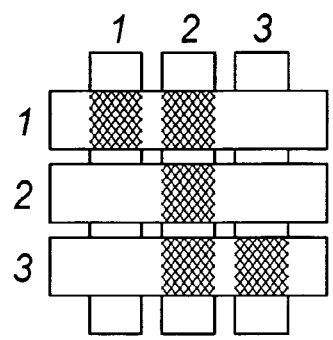
FIGS. 5A and 5B illustrate one exemplary timing diagram for row and column signals that may be used to write a frame of display data to the 3×3 interferometric modulator display of FIG. 2.
Figure 5B:
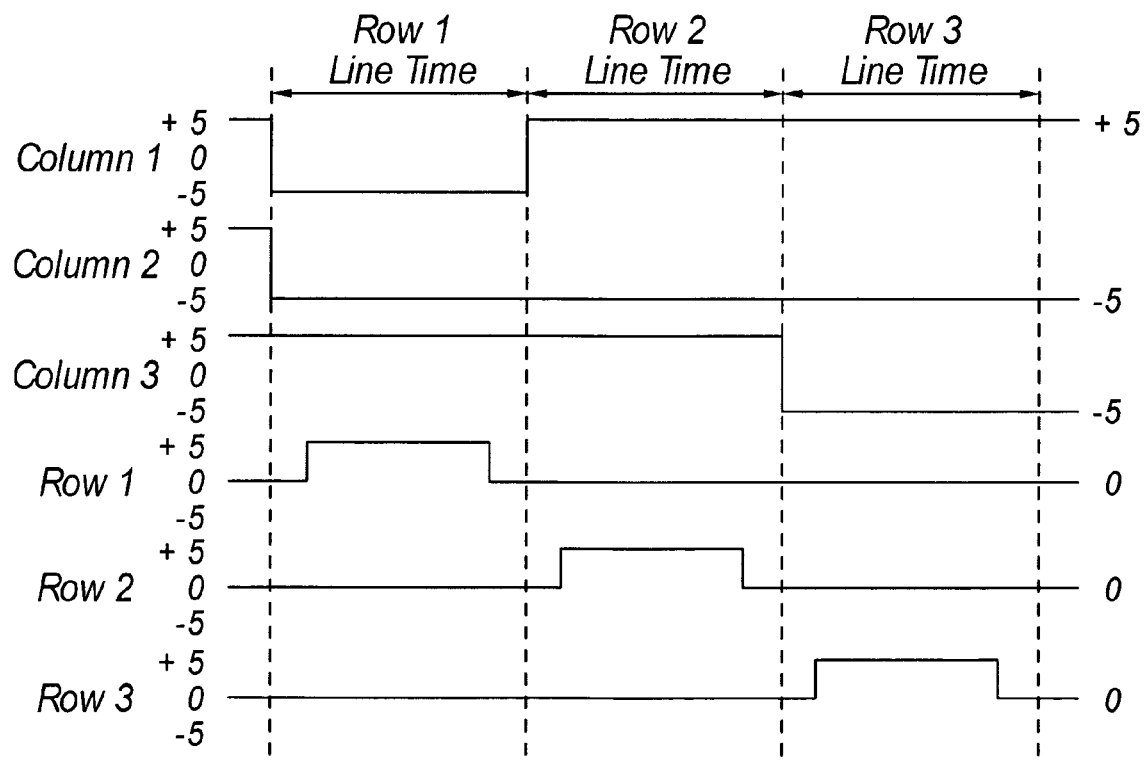

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
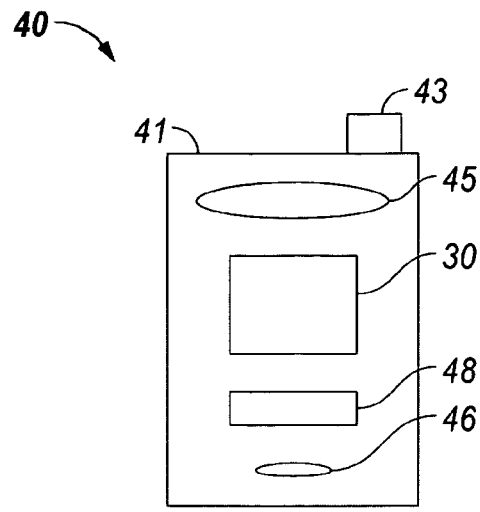
FIGS. 6A and 6B are system block diagrams illustrating an embodiment of a visual display device comprising a plurality of interferometric modulators.
Figure 6B:
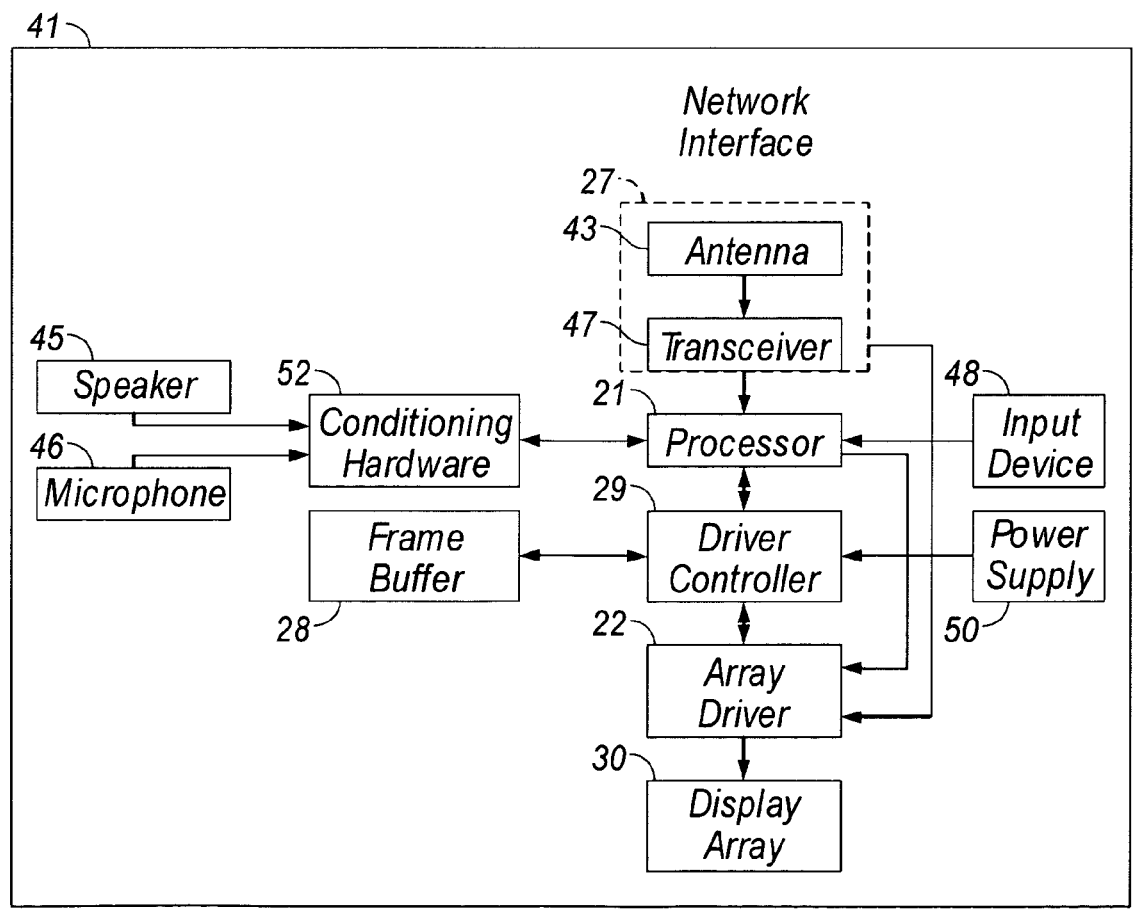

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.12 standard, including IEEE 802.12(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
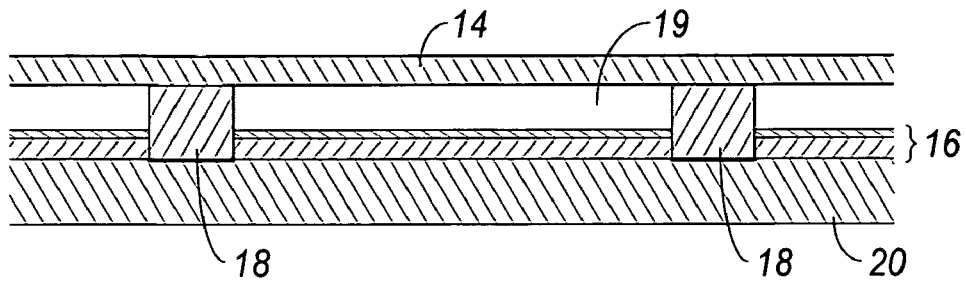
FIG. 7A is a cross section of the device of FIG. 1.
Figure 7B:
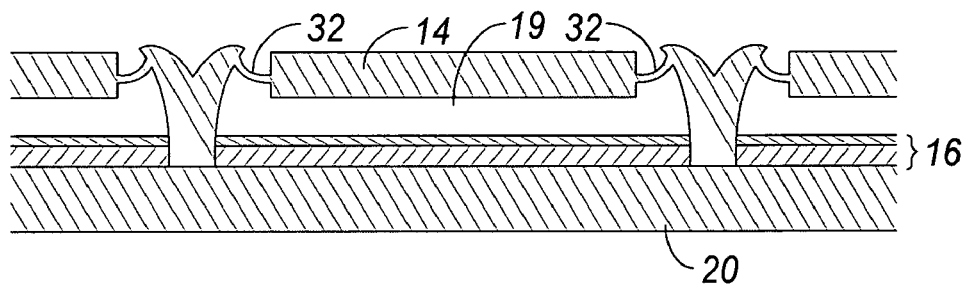
FIG. 7B is a cross section of an alternative embodiment of an interferometric modulator.
Figure 7C:
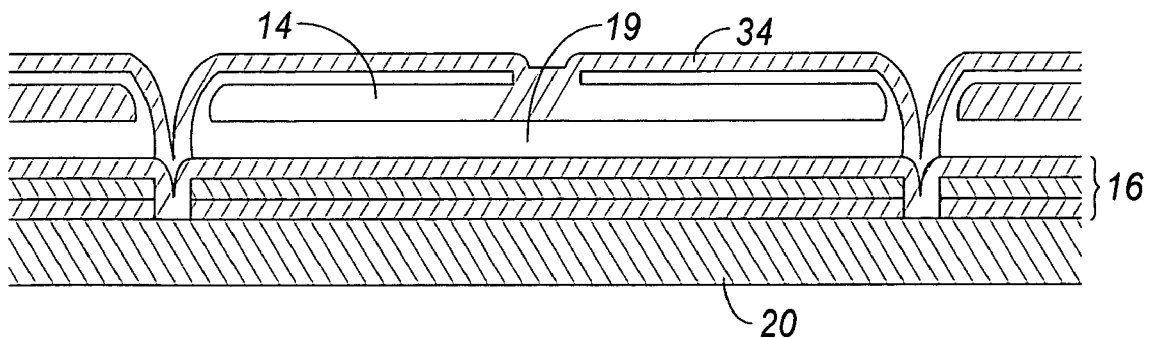
FIG. 7C is a cross section of another alternative embodiment of an interferometric modulator.
Figure 7D:
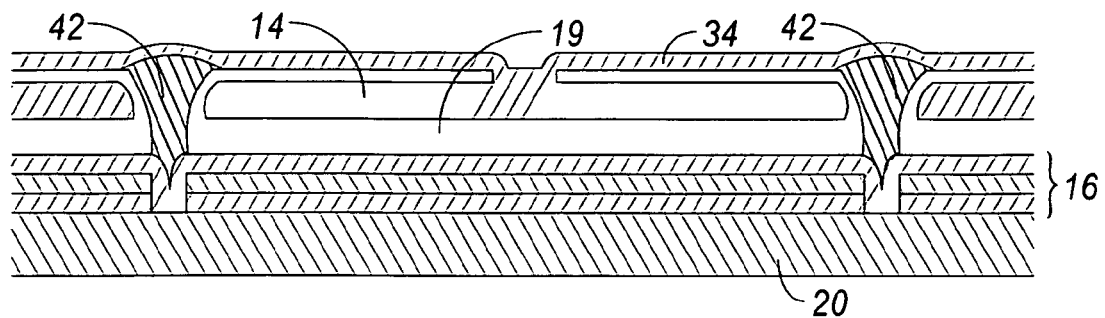
FIG. 7D is a cross section of yet another alternative embodiment of an interferometric modulator.
Figure 7E:
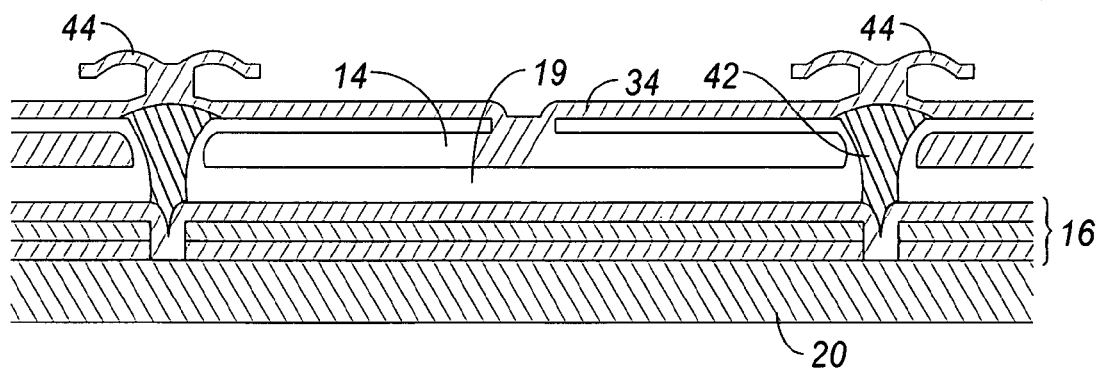
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8:
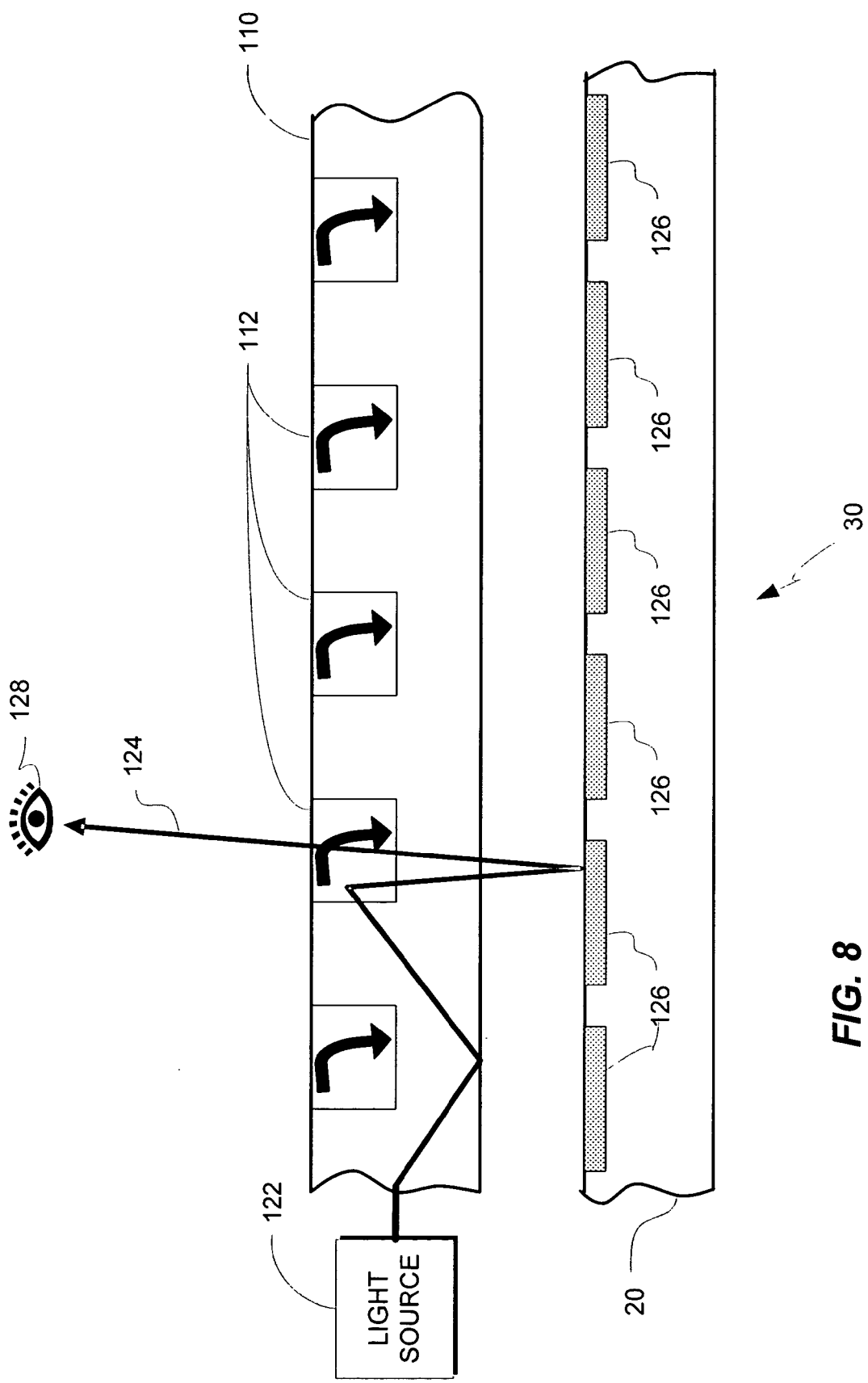
FIG. 8 is a cross section of an example of a display system comprising an array of light modulators, such as devices illustrated in FIG. 1, illuminated by an illuminator.

FIG. 8 is a cross section of an example of display system that comprises an example of the array of light modulators 30 illuminated by an illuminator 110 comprising an array of illuminating or light turning elements 112. As illustrated in the example system of FIG. 8, the light turning elements 112 direct light 124 such as from a light source 122 to the light modulators 126 and then to a viewing position 128. In one embodiment, the light modulators 126 comprise reflective light modulators such as the interferometric modulators such as illustrated in FIGS. 1, 7A, 7B, 7C, 7D, and 7E. Other embodiments may comprise other types of light modulators. In one embodiment, the light turning elements 112 comprise at least partially reflective surfaces configured to direct the light 124 to the light modulators 126. In other embodiments, the illuminator 110 may comprise various structures configured to illuminate the light modulators 126. For example, the light turning elements 112 may comprise any other suitable structure for directing a pattern of light onto the light modulators 126. Moreover, the light turning elements 112 may comprise materials, e.g., photoluminescent or electroluminescent materials, configured to direct a pattern of illumination onto the light modulators 126.

Figure 9:
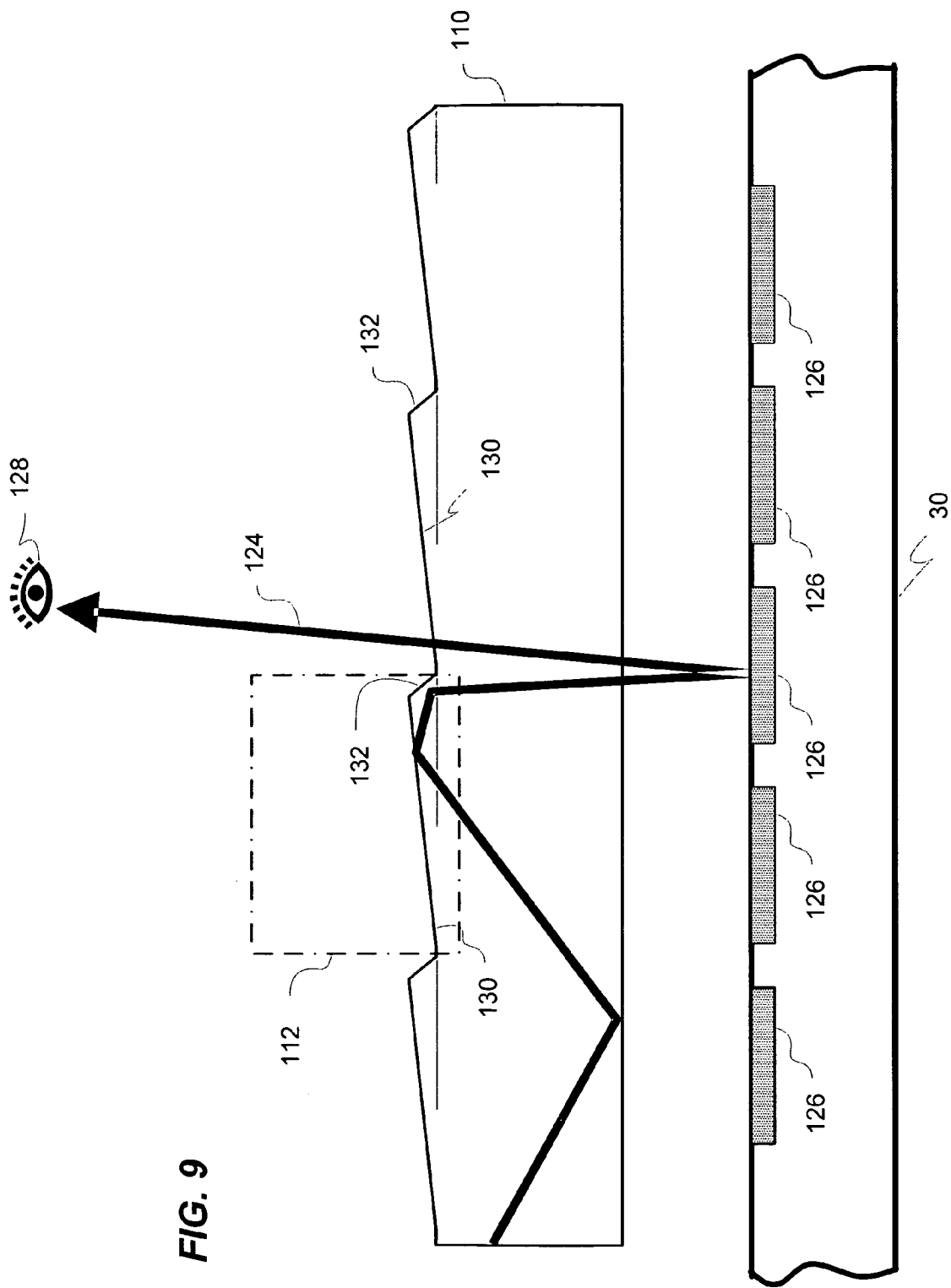
FIG. 9 is a cross section of an example of display system such as illustrated in FIG. 8 that comprises an array of light modulators illuminated by an illuminator comprising an array of reflective light turning elements.

FIG. 9 is a cross section of an example of display system such as illustrated in FIG. 8 that comprises an array 30 of light modulators 126 illuminated by an array of reflective light turning elements 112. The example light turning elements 112 in FIG. 9 each comprise surfaces 130 and 132 that are configured to direct light to the light modulators 126. In the illustrated embodiment, the light 124 enters through a side surface of the illuminator 110. The illuminator 110 internally reflects the light 124 until the light 124 strikes the surfaces 130 and 132 so as to be directed onto one or more of the light modulators 126, which in turn modulate the light 124 and direct a portion of the modulated light to the viewing position 128. In one embodiment, the illuminator 110 is configured with respect to the light source (e.g., light source 122 of FIG. 8) so that total internal reflectance of the light 124 within the illuminator 110 reduces loss of the light 124 except when reflected by the light turning elements 112 towards the light modulators 126.

FIG. 10A is a cross section of an example of an array of periodically spaced light turning elements 112 in the illuminator 110 such as illustrated in FIG. 9. In FIG. 10, each light turning element 112 is represented schematically and separated from adjacent light turning elements 112 by a substantially fixed distance $P_{FL}$ that is indicative of the periodicity of the light turning elements 112 in the illuminator 110. Note that in some embodiments, the distance $P_{FL}$ is gradually decreased as the distance within the illuminator 110 increases from a light source. However, for a particular line of light turning elements $P_{FL}$, the distance $P_{FL}$ between each adjacent line of light turning elements 112 in such an embodiment is substantially the same. Thus, a Moiré pattern may still be visible.

FIG. 10B is a perspective view of an example of the illuminator 110 comprising the array of periodically spaced reflective light turning elements 112 such as illustrated in FIG. 10A. In the embodiment illustrated in FIG. 10B, the surfaces 130 and 132 form lines, e.g., rows or columns, approximately along one axis of the illuminator 110. Thus, each light turning element 112 may illuminate a plurality of light modulators 126, for example, one or more rows or columns of light modulators 126. The periodicity, $P_{FL}$, of the array of light turning elements 112 is illustrated with reference to the reflective surfaces 130 and 132 of each of the light turning elements 112. FIG. 10C is a top view further illustrating the example of the illuminator 110 comprising the periodic array of periodically spaced reflective light turning elements 112 such as illustrated in FIG. 10B.

Figures 11A, 11B:
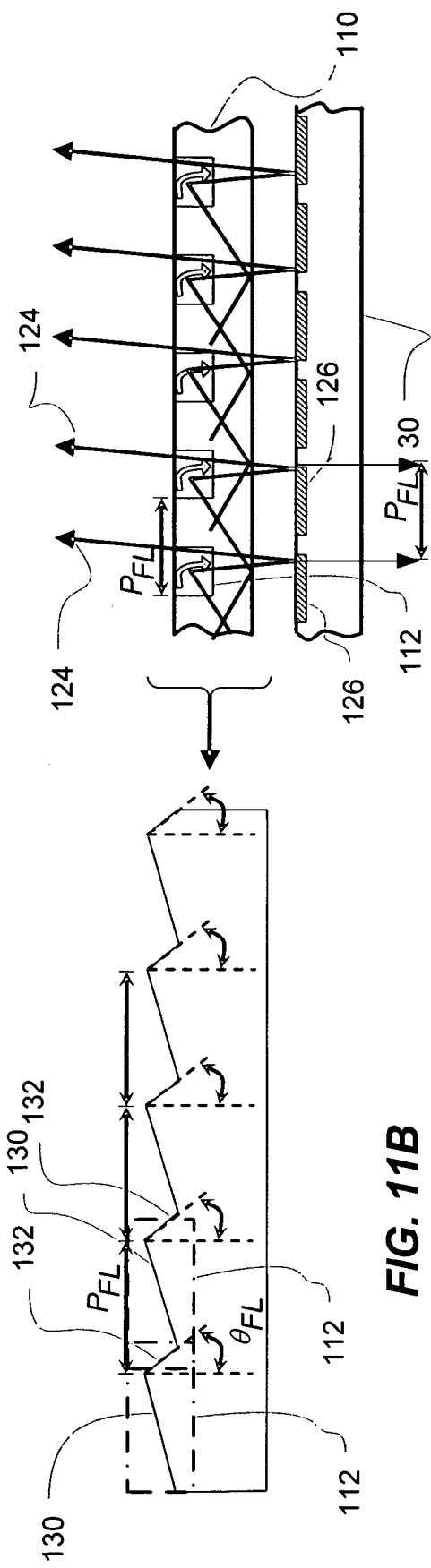
FIG. 11A illustrates a cross section view of an illuminator comprising a periodically arranged reflective light turning elements such as illustrated in FIG. 10B.
FIG. 11B illustrates a schematic cross section view of an illuminator comprising a periodically arranged reflective light turning elements and a light modulator array such as illustrated in FIG. 9.

FIG. 11A illustrates a schematic cross section view of a periodically arranged light turning elements 112 and a light modulator array such as illustrated in FIG. 10A. Each of the light turning elements 112 is separated by a distance $P_{FL}$ indicative of the periodicity of the array of light turning elements 112. FIG. 11A illustrates light 124 periodically directed by the light turning elements 112 onto the modulator array 30.

FIG. 11B illustrates a cross section view of the example of the periodically arranged reflective light turning array 110 such as illustrated in FIG. 11A. The light reflecting surfaces 130 and 132 of each of the illustrated light turning elements 112 are positioned at an angle of $\theta_{FL}$.

It has been found that when a periodic array of light turning elements 112 is positioned between a periodic array of light modulators 126 and viewing positions 128 of the light modulators 126, the superposition of the two periodic structures tends to create visual artifacts. These visual artifacts typically comprise lines or two dimensional patterns of lights formed as an interference or Moiré pattern.

Figure 12:
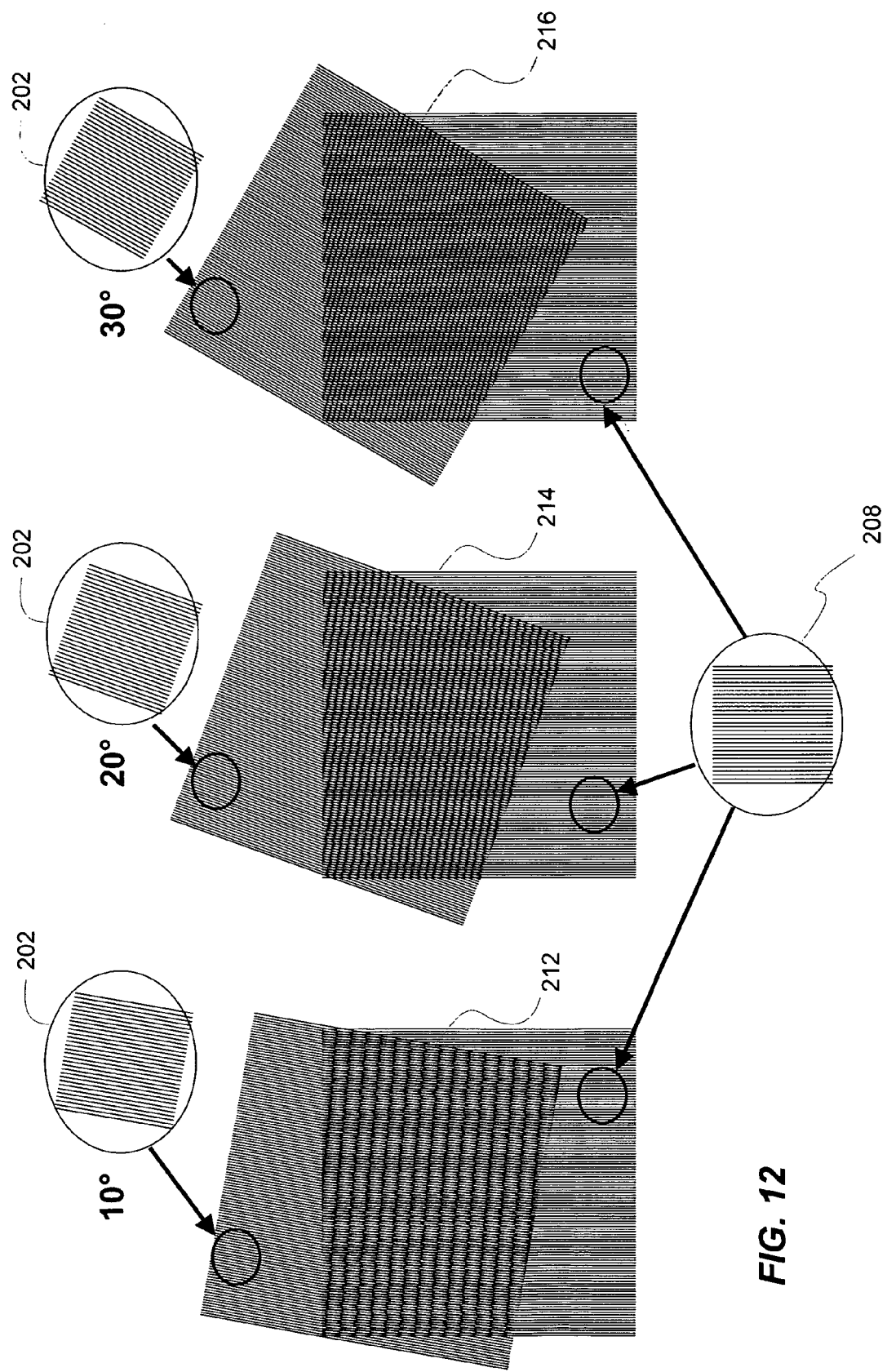
FIG. 12 is a top view exemplifying moiré patterns formed by three sets of two superimposed periodic arrangements of lines.

FIG. 12 is a top view exemplifying Moiré patterns formed by three sets of two superimposed periodic arrangements of lines. In particular, FIG. 12 illustrates Moiré patterns formed in regions 212, 214, and 216 where a pattern 202 of lines and a pattern 208 of lines overlap at angles of 10°, 20°, and 30°, respectively. As illustrated in each of the overlap regions 212, 214, and 216, an interference pattern of somewhat horizontal lines (angled slightly toward the lower right corner of FIG. 12). It is to be recognized that while the Moiré patterns of FIG. 12 are formed by patterns of lines that overlap at different angles, it is the resulting difference in superimposed periodicity that generates the artifacts of the Moiré pattern. Thus, such artifacts can be generated by two overlapping periodic patterns such as the illuminator 110 and the light modulator array 30 regardless of the alignment of the two arrays. It has been found that by arranging the light turning elements 112 of the illuminator 110 to direct a nonuniformly varying pattern of light to the light modulators 126, the Moiré patterns are substantially reduced. Note that a periodic arrangement of light turning elements 112 such as in FIG. 11A generally produces a nonuniform pattern of light. However, such a pattern of light on the light modulators 126 varies substantially uniformly in accordance with the pattern of light turning elements 112. As discussed in further detail below with respect to various embodiments, a nonuniform arrangement of light turning elements 112 directs a nonuniformly varying pattern of light on the light modulators 126 that varies nonuniformly according to the nonuniform arrangement of the light turning elements 112.

Figures 13A, 13B:
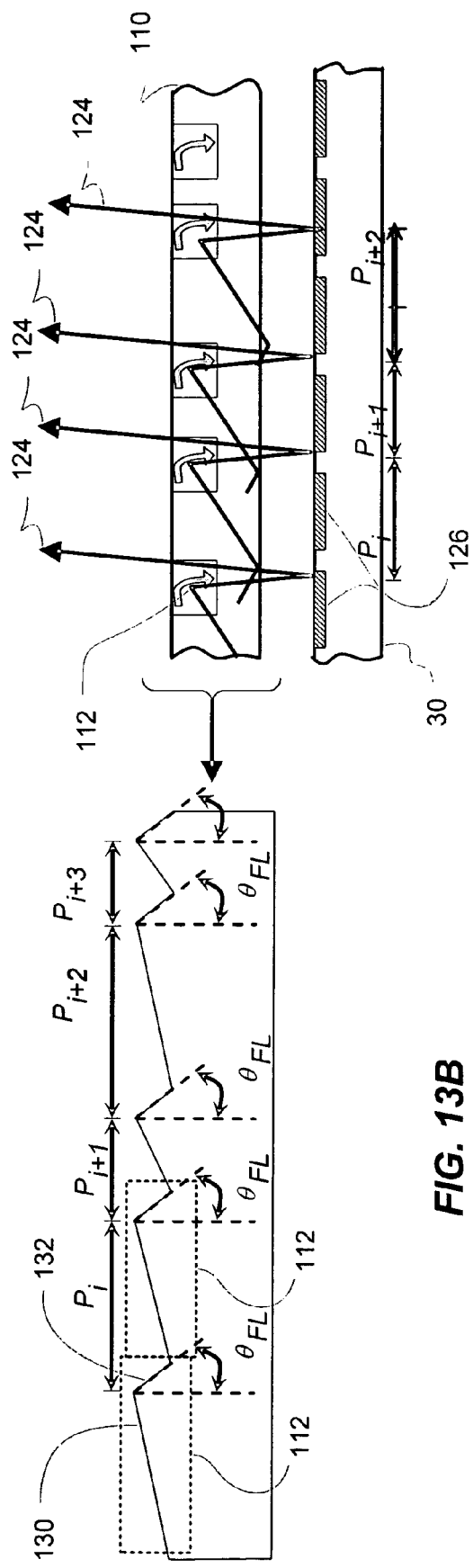
FIG. 13A illustrates a cross section view of an illuminator comprising nonuniformly arranged reflective light turning elements.
FIG. 13B illustrates a schematic cross section view of an illuminator comprising a nonuniformly arranged reflective light turning elements and a light modulator array such as illustrated in FIG. 13A.

FIG. 13A illustrates a schematic cross section view of an example of an light turning array 110 in which the light turning elements 112 are aperiodically or nonuniformly spaced. Each of light turning elements 112 is positioned from adjacent light turning elements 112 by different distances, e.g., $P_i$, $P_{i+1}$, $P_{i+2}$, etc. Thus, light rays 124 reflected by the light turning elements 112 collectively define a non-periodically, or nonuniformly varying, pattern of light illuminating the light modulators 126.

FIG. 13B illustrates a cross section view of the nonuniformly arranged reflective light turning array 110 such as illustrated schematically in FIG. 13A. In the embodiment illustrated in FIG. 13B, the surface 130 each light turning element 112 is positioned at substantially the same angle $\theta_{FL}$ relative to the surface 132 of the same light turning element 112. In contrast, the position of each adjacent line of light turning elements 112 varies, e.g., the distances $P_i$, $P_{i+1}$, $P_{i+2}$, vary. For example, in one embodiment, each value $P_i$ within the array is different. In another embodiment, the distances repeat at a sufficiently low frequency within the light turning array 110 that the interaction with the light modulator array 30 produces no substantial visible artifacts.

Figure 14:
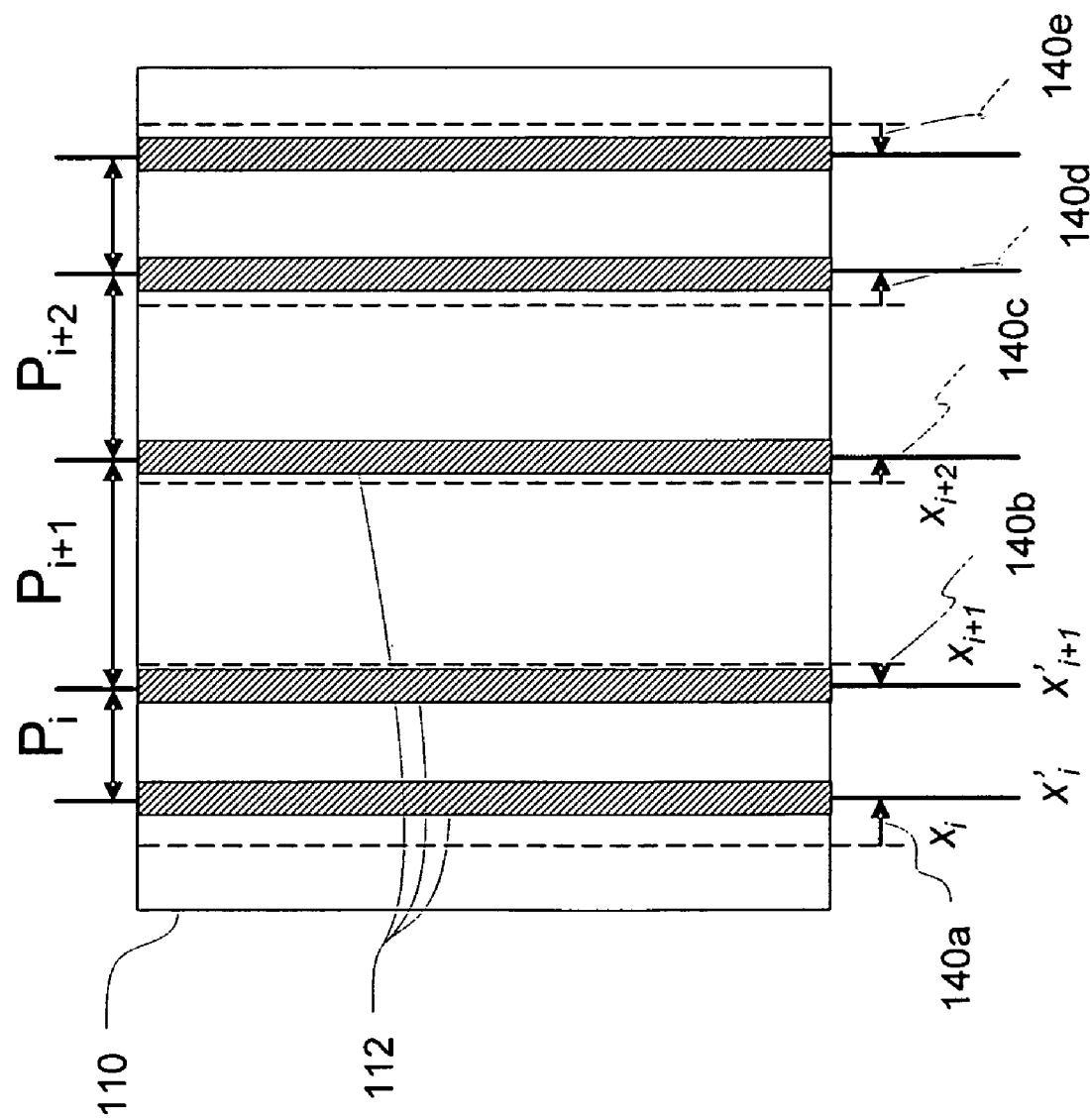
FIG. 14 illustrates a top view of the nonuniformly arranged light turning elements illustrated in FIG. 13A.

FIG. 14 illustrates a top view of the nonuniformly arranged light turning array 110 illustrated in FIG. 13B. FIG. 14 illustrates the positions $X'_i$, $X'_{i+1}$, $X'_{i+2}$, etc. of each of the light turning elements 112 (e.g., the position of the intersection of the surface 130 and the surface 132). Each of these positions $X'_i$, $X'_{i+1}$, $X'_{i+2}$ is offset from a corresponding periodically spaced position $X_i$, $X_{i+1}$, $X_{i+2}$ by an offset distance 140a, 140b, 140c, 140d, 140e (collectively offset distances 140). Each of the offset distances 140 may be different in a particular array 110. Alternatively, each of the offset distances 140 in a particular array 110 may be selected randomly, e.g., from within a range of available offsets. Note that as used herein random refers to random and pseudo random selections. In yet another embodiment, each offset distance 140a, 140b, 140c, 140d, 140e may be selected to have a pattern that repeats throughout the array 110 with a frequency that is too low to result in any substantial visible artifacts. The offset distances 140 may be selected, randomly or otherwise, to be distributed according to a particular distribution within a range of distances, for example, the distances may be distributed with uniform or Gaussian distribution. In one embodiment, each offset distance ($X'_i - X_i$) is determined by multiplying a random number between −1 and +1 with the separation from the first neighboring unit, such as ($X_{i+1} - X_i$) or ($X_i - X_{i-1}$). In another embodiment, the random number multiplier is between −0.5 and 0.5. In yet another embodiment, at least two offset distances are selected and applied in a random order to each light turning element $X_i$ (this order can be completely random, or a prescribed random sequence such as the Fibonacci, Thue-Morse, or other similar random numerical sequences. In one embodiment, the at least two offset distances are selected randomly so that at least one of them is larger than 10% of the average separation between light turning elements. It is to be recognized that randomness selection in the arrangement of light turning elements 112 is generally incorporated at the design or manufacturing stage. During manufacturing, a particular arrangement of light turning elements 112 may be substantially reproduced once or many times.

FIG. 15A illustrates a top view of another embodiment of another example of an illuminator comprising an array of a nonuniformly arranged light turning elements 112 that is conceptually similar to that of FIG. 13A. In the example illustrated in FIG. 15A, the light turning elements 112 comprise regions of the illuminator 110 that include the reflecting surfaces 130 and 132. The light turning elements 112 of FIG. 15A may be varied in both size and position so that the illuminator 110 directs a nonuniformly varying pattern of light to the modulator array 30 (not shown) in one or both of vertical and horizontal dimensions. In the embodiment illustrated in FIG. 15A, a line of the light turning elements 112 is distributed generally along lines $X_j$, $X_{j+1}$, ... $X_k$. In the illustrated embodiment, each of the light turning elements 112 is offset by a random distance in both the vertical (Y) and horizontal (X) from a position along one of the lines $X_j$, ... $X_k$. The vertical and horizontal offsets may be determined in any suitable way, including those discussed with reference to FIG. 14. In one embodiment, the vertical offsets may be zero.

FIG. 15B illustrates a top view of a portion 150 of the illuminator 110 of FIG. 15A in more detail. The example of the portion 150 comprises light turning elements 112a, 112b, and 112c that are each offset in the horizontal direction along an axis $X_k$, where k is a value between 1 and N, the number of lines in a particular illuminator, and where k represents a particular vertical line of light turning elements in the illuminator 110. In one embodiment, offset of the reflective surfaces 130 and 132 of each light turning element 112a, 112b, or 112c varies by horizontal offsets that change at positions $Y_{k,j}$, where j is a value between 1 and M, the number of light turning elements 112 in a particular line in a particular illuminator, and where j represents a particular vertical position of a particular light turning element 112 in the line k of light turning elements 112. The vertical length of the light turning element elements 112, e.g., element 112b is determined by a corresponding vertical position, $Y_{k,j}$ and the vertical position $Y_{k,j+1}$ of the adjacent element 112c. Each vertical position $Y_{k,j}$ may be selected so that each light turning element 112 has a vertical size or extent within a particular range, e.g., $\Delta Y_{min}$ and $\Delta Y_{max}$. In one embodiment, the vertical size of each light turning element 112 is randomly distributed within the range e.g., $\Delta Y_{min}$ and $\Delta Y_{max}$. The light turning element 112b at vertical position $Y_{k,j}$ is also offset by an amount $\Delta X_{k,j}$ from the line $X_k$. In one embodiment, the vertical positions $Y_{k,j}$ are distributed within a particular or predetermined range of distances, e.g., between $\Delta X_{min}$ and $\Delta X_{max}$. In one embodiment, the positions $Y_{k,j}$ are randomly distributed within the range of distances. It is to be recognized that while in one embodiment, each light turning element 112 is desirably offset in both vertical and horizontal directions, in other embodiments, the light turning element 112 may be offset only in one of the vertical or horizontal directions. The illuminator 110 of FIGS. 15A and 15B thus is configured to direct a nonuniformly varying pattern of light to light modulators such as the array 30 of light modulators 126 of FIG. 11A.

Figure 16B:
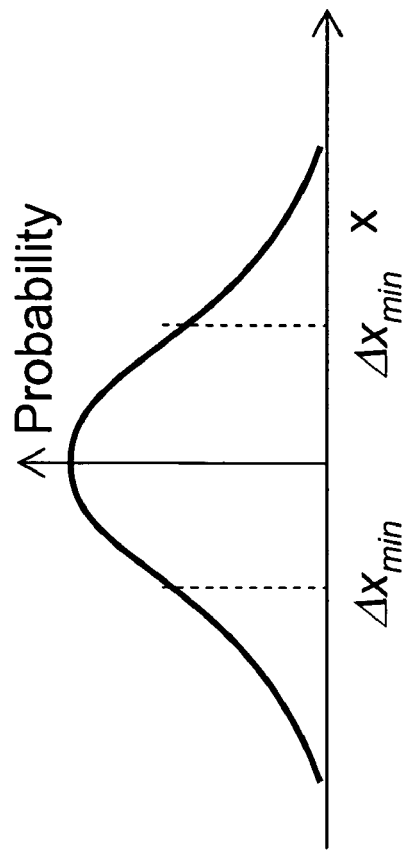
FIG. 16B is a graphical illustration of a normal distribution illustrative of the nonuniform distribution of elements in one embodiment of a light turning array such as illustrated in FIG. 15A
Figure 16A:
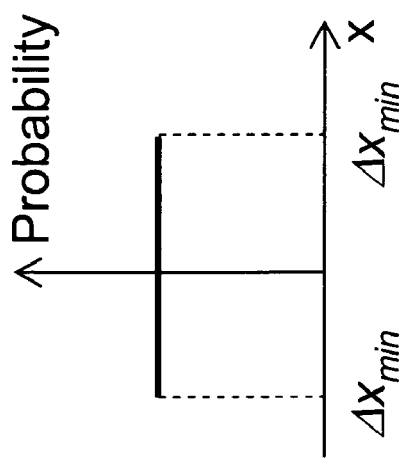
FIG. 16A is a graphical illustration of a uniform distribution illustrative of the distribution of elements in one embodiment of a light turning array such as illustrated in FIG. 15A.

FIG. 16A is a graphical illustration of a uniform distribution illustrative of the nonuniform distribution of light turning elements 112 in one embodiment of the illuminator 110. As noted above, in one embodiment, the horizontal offset positions $X_{k,j}$ of the light turning elements 112 along a line of light turning elements are randomly distributed within a range of distances, e.g., $\Delta X_{min}$ and $\Delta X_{max}$. In one embodiment, the offset for each light turning element 112 may be selected according to a uniform distribution such as illustrated in FIG. 16A. Hence, the distribution of offsets is a uniform distribution that results in a nonuniform arrangement of the light turning elements.

FIG. 16B is a graphical illustration of a normal distribution illustrative of the nonuniform distribution of light turning elements 112 in one embodiment of the illuminator 110. In one embodiment, the offset for each light turning element 112 may be selected according to a normal (Gaussian) distribution such as illustrated in FIG. 16A. It is to be recognized that in various embodiments the light turning elements 112 may be distributed based on any suitable mathematical distribution that generates a substantially nonuniform array.

Figure 17B:
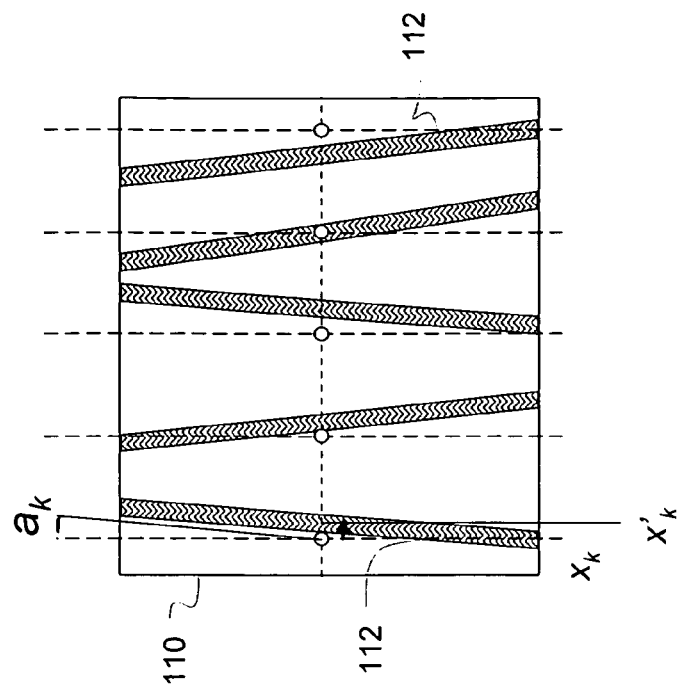
FIG. 17B illustrates a top view of another embodiment of an illuminator comprising nonuniformly arranged reflective light turning elements that is conceptually similar to that of FIG. 17A.
Figure 17A:
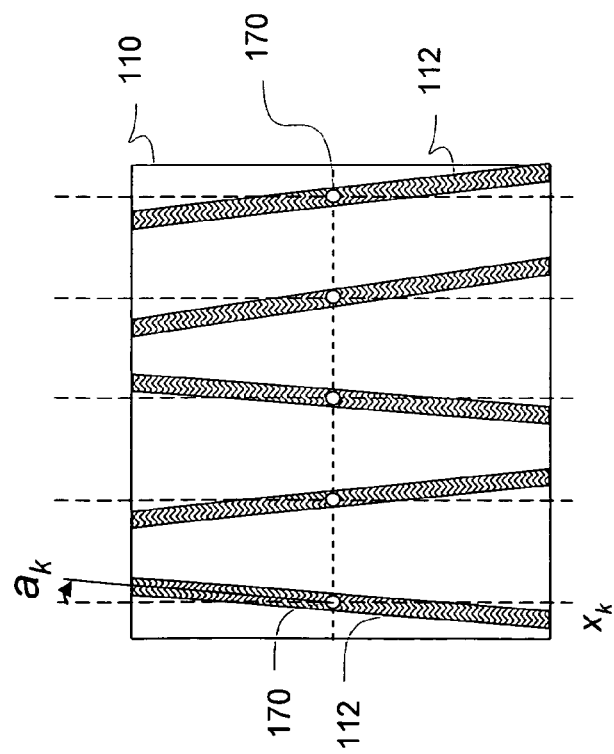
FIG. 17A illustrates a top view of another embodiment of an illuminator comprising nonuniformly arranged reflective light turning elements that is conceptually similar to that of FIG. 15A.

FIG. 17A illustrates a top view of another example of the illuminator 110 comprising an array of a nonuniformly arranged light turning elements 112 that is conceptually similar to that of FIG. 13A. In the embodiment illustrated in FIG. 17A, a nonuniformly varying pattern of reflected light is achieved by rotating each of the light reflecting elements 112 about a point 170 by an angle $a_k$. Each light turning element 112 may have a different angle $a_k$ of rotation (e.g., from vertical line $X_k$) that is distributed within a range $a_{min}$ to $a_{max}$. In one embodiment, the angles $a_k$ are randomly distributed within the range, e.g., according to a uniform or Gaussian distribution. The angles may be selected in any suitable way, including according to methods similar to those discussed with reference to FIG. 14.

FIG. 17B illustrates a top view of another example of the illuminator 110 comprising an array of a nonuniformly arranged light turning elements 112 that is conceptually similar to that of FIG. 17A. In the example of FIG. 17A, each of the light turning elements 112 is rotated about the positions 170 along each line $X_k$, which are with substantially equal distances $P_{FL}$ horizontally between each line $X_k$ on the illuminator 110. In the example of FIG. 17B, each light turning element 112 is rotated about a point that is randomly selected at a distance $X'_k$ along the line $X_k$. The distance $X'_k$ of each line $X_k$ may be selected from a range of distances, e.g., $\Delta X'_{min}$ and $\Delta X'_{max}$. In one embodiment, the distances $X'_k$ are randomly distributed within the range, e.g., according to a uniform or Gaussian distribution. Thus, the periodicity of the pattern of light directed from the light turning elements 112 of FIG. 17B to the light modulators 30 (not shown) is further reduced with respect to the embodiment illustrated in FIG. 17A. In other embodiments, the offset distances $X'_k$ may be selected from a set in which each distance in the set is used one or more times. In one such an embodiment, any repetition of particular offset distances $X'_k$ is minimized and preferably offset distances $X'_k$ of adjacent light turning elements 112 are different. The distances $X'_k$ may be determined in any suitable way, including those discussed with reference to FIG. 14.

Figure 18B:
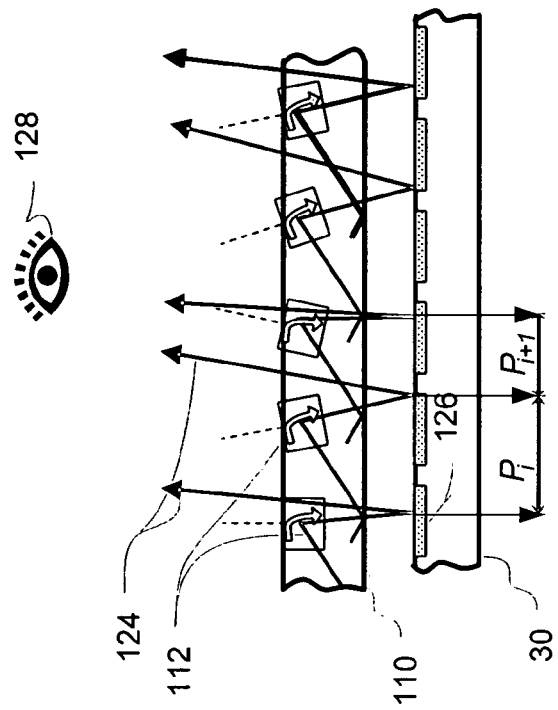
FIG. 18B illustrates a schematic cross section view of the nonuniformly arranged light turning array of FIG. 18A in relation to a display.
Figure 18A:
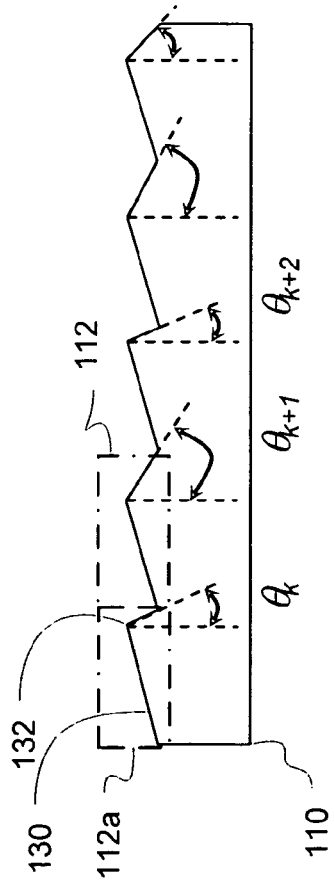
FIG. 18A illustrates a cross section view of yet another embodiment of a nonuniformly arranged light turning array that is conceptually similar to that of FIG. 13A.

FIG. 18A illustrates a top view of another example of the illuminator 110 comprising an array of a nonuniformly arranged light turning elements 112 that is conceptually similar to that of FIG. 13A. In the example of FIG. 18A, each of the light turning elements 112 is positioned along each line $X_k$. To direct a nonuniformly varying pattern of light, the reflecting surface 130 of each light turning element 112, e.g., element 112a, intersects the reflecting surface 132 at an angle, e.g., $\theta_k$. In one embodiment, the angle $\theta_k$, $\theta_{k+1}$, $\theta_{k+2}$, corresponding to each of, at least, adjacent light turning elements 112 is different. For example, each light turning element 112 may have a different angle $\theta_k$ that is distributed within a range $\theta_{min}$ to $\theta_{max}$. In one embodiment, the angle $\theta_k$ are randomly distributed within the range, e.g., according to a uniform or Gaussian distribution. In other embodiments, the angles $\theta_k$ may be selected from a set in which each angle in the set is used one or more times. In one such an embodiment, any repetition of particular angles $\theta_k$ is minimized and preferably angles of adjacent light turning elements 112 are different. The angles $\theta_k$ may be selected in any suitable way, including according to methods similar to those discussed with reference to FIG. 14. In one embodiment, the range $\theta_{min}$ to $\theta_{max}$ is selected to exceed the larger of the vertical angular divergence of the light emitted by the illuminator in the plane of the $\theta_k$ rotation and of +/−1°, which is the angular cone typically collected by the human eye.

FIG. 18B illustrates a schematic cross section view of the nonuniformly arranged illuminator 110 of FIG. 18A in relation to the array 30 of light modulators 130. As illustrated schematically, each of light turning elements 112 direct light from the illuminator 110 at different angles to generate a nonuniformly varying pattern of light 124 that is modulated, and in the illustrated example reflected, by the array 30 of light modulators 126. In particular, the distances $P_i$, $P_{i+1}$ between the light rays 124 directed onto the array 30 vary nonuniformly within the illuminator 110.

In one embodiment, the illuminator 110 is formed separately from the light modulator array 30 and then applied to the array 30. In another embodiment, the illuminator 110 is formed on or above the substrate 20.

It is to be recognized that while certain embodiments are disclosed with reference to horizontal or vertical axis, in other embodiments, the arrangement of components of the illuminator 110 or light modulator array 30 with respect to horizontal and vertical axis may be reversed. Furthermore, it is to be recognized that embodiments may include combinations of features described with respect to the disclosed examples of light turning elements 112 that direct nonuniformly varying patterns of light to the light modulator array 130, regardless of whether such combinations are expressly disclosed herein.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A display device, comprising:
a plurality of light modulators disposed on a substrate; and
a plurality of illumination elements formed substantially along a plane and configured to extract light from a light guide, and to transform the extracted light into a non-uniformly varying pattern of light, the plurality of illumination elements being further configured to direct the non-uniformly varying pattern of light to the light modulators, wherein each of the illumination elements comprises at least one surface defining an angle with respect to the substrate and wherein each of said surfaces is configured to direct the non-uniformly varying pattern of light to at least one of said light modulators.

2. The device of claim 1, further comprising a light source configured to provide light to the plurality of illumination elements.

3. The device of claim 1, wherein the surfaces of at least two of the illumination elements define different angles with respect to the substrate.

4. The device of claim 1, wherein the illumination elements are arranged in a non-uniform pattern.

5. The device of claim 4, wherein each of the illumination elements is positioned adjacent to at least one other of the illumination elements and each of the illumination elements is positioned at a non-uniform offset from said at least one other of the illumination elements.

6. The device of claim 5, wherein said offset comprises an offset in two dimensions.

7. The device of claim 5, wherein at least two of the illumination elements have different sizes.

8. The device of claim 4, wherein the illumination elements are arranged in a plurality of lines and wherein the lines are non-parallel to each other.

9. The device of claim 8, wherein each of the lines has a midpoint, and wherein the midpoints of the lines are arranged non-uniformly within the plurality of illumination elements.

10. The device of claim 1, wherein light modulators comprise interferometric light modulators.

11. The device of claim 1, further comprising:
a processor that is in electrical communication with said light modulators, said processor being configured to process image data;
a memory device in electrical communication with said processor.

12. The device of claim 11, further comprising a driver circuit configured to send at least one signal to said light modulators.

13. The device of claim 12, further comprising a controller configured to send at least a portion of said image data to said driver circuit.

14. The device of claim 11, further comprising an image source module configured to send said image data to said processor.

15. The device of claim 14, wherein said image source module comprises at least one of a receiver, transceiver, and transmitter.

16. The device of claim 11, further comprising an input device configured to receive input data and to communicate said input data to said processor.

17. A display device comprising:
a plurality of light modulators; and
a plurality of illumination elements arranged in a plurality of lines, each line of the plurality of lines being disposed at a non-uniform offset from each adjacent line of the plurality of lines, the illumination elements configured to direct light to the light modulators.

18. A display device comprising:
a plurality of light modulators; and
a plurality of discontinuous illumination elements arranged along a series of lines and configured to direct light to the light modulators, wherein each of the plurality of discontinuous illumination elements is arranged along, and offset from, one of the series of lines and wherein the series of lines is formed substantially in a plane.

19. A display device comprising:
a plurality of interferometric modulators disposed on a substrate and configured for modulating light; and
a plurality of illumination elements configured for extracting light from a light guide, for transforming the extracted light into a non-uniformly varying pattern of light and for illuminating the interferometric modulators with the non-uniformly varying pattern of light.

20. The device of claim 19, wherein the plurality of illumination elements comprises means for reflecting light.

21. The device of claim 19, wherein each of the illumination elements comprises a surface defining an angle with respect to the substrate, wherein each of said surfaces is configured to direct light to said interferometric modulators.

22. A method of making an illuminator, the method comprising:
forming a plurality of illumination elements substantially along a plane, the illumination elements configured to extract light from a light guide, to transform the extracted light into a non-uniformly varying pattern of light and to direct the non-uniformly varying pattern of light to an array of light modulators.

23. The device of claim 22, further comprising forming the array of light modulators on a substrate.

24. The device of claim 23, wherein forming the plurality of illumination elements comprises forming the plurality illumination elements above the substrate.

25. The device of claim 22, wherein forming each of the plurality of illumination elements comprises forming at least one surface configured to direct the non-uniformly varying pattern of light onto at least one light modulator in the array of light modulators.

26. The device of claim 25, wherein the surfaces of at least two of the illumination elements define different angles with respect to a substrate on which the light modulators are formed.

27. The device of claim 22, wherein the illumination elements are arranged in a non-uniform pattern.

28. The device of claim 27, wherein each of the illumination elements is formed at a position adjacent to at least one other of the illumination elements and each of the illumination elements is formed at a position at a non-uniform offset from said at least one other of the illumination elements.

29. The device of claim 27, wherein the illumination elements are arranged in a plurality of lines and wherein the lines are non-parallel to each other.

30. The device of claim 29, wherein each of the lines has a midpoint, and wherein the midpoints of the lines are arranged non-uniformly within the plurality of illumination elements.

31. The device of claim 22, wherein the light modulators comprise interferometric light modulators.

32. A method, comprising:
illuminating a plurality of illumination elements with light;
directing a non-uniformly varying pattern of the light formed from the illumination elements to a plurality of interferometric light modulators; and
interferometrically modulating the non-uniformly varying pattern of light with the interferometric light modulators.

33. The method of claim 32, further comprising disposing the plurality of light modulators on a substrate, wherein each of the illumination elements comprises at least one surface defining an angle with respect to the substrate and wherein each of said surfaces is configured to direct the non-uniformly varying pattern of light to at least one of said light modulators.

34. The method of claim 32, wherein the illumination elements are arranged in a non-uniform pattern.

* * * * *